US006560838B1

(12) United States Patent
Ito et al.

(10) Patent No.: US 6,560,838 B1

(45) Date of Patent: May 13, 2003

(54) SHEET METAL REPAIR METHOD, SHEET METAL REPAIR TOOL, AND SHEET-LIKE MEMBER FIXING DEVICE

(76) Inventors: Akio Ito, 1813, Sone, Biwa-Cho, Higashiazai-Gun, Shiga 526-0103 (JP); Eiji Tokuhara, 409-7, Yawatanakayama-Cho, Nagahama-Shi Shiga 526-0021 (JP)

( * ) Notice: Subject to any disclaimer, the term of this patent is extended or adjusted under 35 U.S.C. 154(b) by 0 days.

(21) Appl. No.: 09/600,841

(22) PCT Filed: Oct. 14, 1999

(86) PCT No.: PCT/JP99/05698

§ 371 (c)(1), (2), (4) Date: Jul. 24, 2000

(87) PCT Pub. No.: WO00/32352

PCT Pub. Date: Jun. 8, 2000

(30) Foreign Application Priority Data

Nov. 27, 1998 (JP) .......................................... 10-336764
May 7, 1999 (JP) .......................................... 11-127329

(51) Int. Cl.[7] .................................................. B23P 6/00

(52) U.S. Cl. ................................ 29/402.11; 29/402.19; 29/469.5; 72/409.11

(58) Field of Search ......................... 29/402.11, 402.13, 29/402.16, 402.19, 426.4, 469.5; 72/372, 379.2, 409.01, 409.11

(56) References Cited

U.S. PATENT DOCUMENTS 2,811,065 A * 10/1957 Johnson ................... 72/409.11
2,972,270 A * 2/1961 Krolick ................... 72/409.11
3,051,279 A * 8/1962 Hougen ................... 72/409.01

FOREIGN PATENT DOCUMENTS

JP 52-62600 * 5/1977
JP 58-84858 * 6/1983

* cited by examiner

*Primary Examiner*—David P. Bryant
(74) *Attorney, Agent, or Firm*—Milde & Hoffberg, LLP

(57) ABSTRACT

A method for repairing a sheet metal (14) of a car body (10), which comprises the steps of removing a damaged part, bending a portion near the end part of a repair member (22) with a sheet-metal repair tool, and bonding the portion near the end part of the repair member to a portion near the end part of the sheet metal (14) in place of the removed part.

10 Claims, 35 Drawing Sheets

PRIOR ART

PRIOR ART

SHEET METAL REPAIR METHOD, SHEET METAL REPAIR TOOL, AND SHEET-LIKE MEMBER FIXING DEVICE

FIELD OF THE INVENTION

The present invention relates to a sheet metal repair method and a sheet metal repair tool for repairing a sheet metal of a damaged car body and the like. Furthermore, the present invention also relates to a sheet-like member fixing device for positioning, supporting, and temporarily fixing a sheet-like member.

BACKGROUND OF THE INVENTION

When a sheet metal of a car body and the like is damaged, a sheet metal repair method for removing a particular portion of the sheet metal including the damaged part and for bonding a repair member to the sheet metal in place of the removed portion has been often employed so far.

For example, when a car body 1 shown in FIG. 43 is damaged due to a car accident, a particular portion 4 of the body including a damaged part 2 was removed by cutting it along a line 3 and then a repair member 6 is bonded to the body 1 in place of the removed portion 5. Before bonding the repair member 6 to the body , a reinforcing member 7 is connected to the portion near the cut part of the body 1, and then the repair member 6 is bonded onto the member 7 by spot welding 8 and 9.

However, in such a sheet metal repair method, the reinforcing member 7 was indispensable, and therefore a repair process became complicated. In addition, the use of the repair member 7 increase the number of joint surfaces, which was a problem in terms of strength and corrosivity.

In a conventional method for repairing a sheet metal (sheet-like member) of a car body, a particular portion including a damaged part of a car body is removed and then a repair member is connected to the body in place of the removed portion. For example, as shown in FIG. 44, a repair member 502 is positioned on a sheet metal 501, and the repair member 502 is bonded to the body by spot welding and the like.

However, when the repair member 502 is bonded to the sheet metal by using such a method, the sheet metal 501 has to be supported by hand. Therefore, it has been desired that greater safety be secured. In order to position the repair member 502 by pressing it against the sheet metal 501, the repair member 502 had to be pushed outward by inserting hand into the space between the sheet metal 501 and an interior panel 503. For this reason, bonding of the member 502 to the sheet metal 501 involved great difficulties. In order to temporarily join the repair member 502 to the sheet metal 501 for spot welding, it was indispensable to use fasteners such as bolts and to insert hand into the space between the sheet metal 501 and the interior panel 503. Thus, temporarily joining involved great difficulties.

Accordingly, inventors of the present invention carried out intensive studies with an objective of providing a sheet metal repair method and a sheet metal repair tool having a sufficiently high bonding strength and resistance to corrosion without using any reinforcing member.

The inventors also carried out intensive studies with an objective of providing a sheet-like member fixing device capable of placing or temporarily fixing a sheet-like member such as a repair member in a particular position while holding it with ease and safety.

The inventors also carried out intensive studies with an objective of providing a sheet-like member fixing device capable of pushing a sheet-like member outward with ease and safety.

SUMMARY OF THE INVENTION

As the results of intensive studies to overcome the above difficulties, the inventors of the present invention have eventually attained the present invention.

Main point of a sheet metal repair method according to the present invention, in which a particular portion including a damaged part of a sheet metal is removed and a repair member is bonded to the sheet metal in place of the removed portion is: to bend a portion near the end part of the repair member which is larger in area than a gap formed by removing the particular portion or a portion near the end part of the sheet metal to which the repair member is bonded in accordance with the shape of the gap so as to form at least a first bent part; and to bond the repair member to the sheet metal in place of the removed portion.

Such a sheet metal repair method makes it possible to repair the sheet metal without using any reinforcing member by bending either a portion near the end part of the repair member or a portion near the end part of the sheet metal to which the repair member is bonded, or by bending both of them so that the repair member is shaped to fit with the gap.

Another main point of the sheet metal repair method according to the present invention is to form a second bent part by bending a portion nearer to the end part of the repair member or a portion nearer to the end part of the sheet metal in the direction opposite to the first bent part so as to bond the portion near the end of the repair member to the sheet metal.

In this sheet metal repair method, a repair member or a sheet metal is bent stepwise to form a first bent part and a second bent part which is bent in the direction opposite to the first bent part. While the end part of the repair member or of the sheet metal is fitted to the first and second bent parts of the sheet metal or of the repair member, the portion nearer to the end than the second bent part of the repair member or of the sheet metal is bonded to the sheet metal or the repair member, and thus the repair member is bonded flush with the sheet metal. The phrase "the end part of the repair member or the sheet metal is fitted to the first and second bent parts of the sheet metal or of the repair member" used herein means that the end part of the sheet metal which is not bent is fitted to the bent parts of the repair member, or that the end part of the repair member which is not bent is fitted to the bent parts of the sheet metal. The phrase "the portion near the end part of the repair member is bonded to the sheet metal" used herein means that the portion near the end part of the repair member which is bent is bonded to the end part of the sheet metal which is not bent, or that the portion near the end part of the sheet metal which is bent is bonded to the end part of the repair member which is not bent.

Still another main point of the sheet metal repair method according to the present invention is to form the first and the second bent parts at one time with a sheet metal repair tool comprising a punch and a die which are shaped to fit with the first and the second bent parts.

In this sheet metal repair method, the first and the second bent parts are manually or automatically formed at one time by sandwiching the repair member between the punch and the die of the sheet metal repair tool.

A further main point of the sheet metal repair method according to the present invention is to bond a part of or a whole of joint surfaces of the repair member and the sheet metal by an adhesive agent, an adhesive agent and rivet, or a combination of an adhesive agent, rivet, and spot welding.

In this sheet metal repair method, the repair member is bonded to the sheet metal by welding, an adhesive agent, or a combination of welding and an adhesive agent.

A still further main point of the sheet metal repair method according to the present invention is to bend the portion near the end part of the repair member and/or the portion near the end part of the sheet metal to remove distortion on the portion near the end part before the repair member and the sheet metal are bonded together.

Another main point of the sheet metal repair method according to the present invention is to bend the portion near the end part of the repair member and/or the portion near the end part of the sheet metal so that the first bent part is curved.

A main point of a sheet metal repair tool according to the present invention, which is used in the sheet metal repair method, for removing a particular portion including a damaged part of a sheet metal and for bonding a repair member to the sheet metal in place of the removed portion is to comprise a punch and a die for forming at least a first bent part by bending the portion near the end part of the repair member and/or the portion near the end part of the sheet metal so that the repair member is bonded to the sheet metal in accordance with a shape of a gap formed by removing the particular portion.

Such sheet metal repair tool is used in the sheet metal repair method of the present invention, and makes it possible to repair the sheet metal by sandwiching the portion near the end of the repair member or of the sheet metal between the punch and the die to form bent parts and by bonding the repair member to the sheet metal in accordance with a shape of the gap without using any reinforcing member.

Another main point of the sheet metal repair tool according to the present invention is to form a second bent part by bending a portion nearer to the end than the first bent part in the direction opposite to the first bent part simultaneously with the formation of the first bent part.

Such sheet metal repair tool makes it possible to bond the repair member to the sheet metal in such a manner that the repair member is flush with the sheet metal, by forming the first bent part and the second bent part which is bent in the direction opposite to the first bent part and then by bonding the portion nearer to the end than the second bent part of the repair member or of the sheet metal to the sheet metal or the repair member.

Further main points of the sheet metal repair tool according to the present invention are; place the punch and the die on the point of action of a lever element having the point of application of force, the fulcrum, and the point of action; and to form at least the first bent part by bringing the punch and the die closer by the application of griping force or pushing force to the point of action.

Such sheet metal repair tool makes it possible to bend the portion near the end part of the repair member or of the sheet metal by the application of griping force or pushing force to the punch and the die, using the action of the lever element.

A still further main point of the sheet metal repair tool of the present invention is that the punch and the die each have a first bending edge and a second bending edge, and that the first bending edges of the punch and the die form the first bent part and the second bending edges form the second bent part.

Such sheet metal repair tool makes it possible to ensure the formation of the first bent part and the second bent part by using the first bending edges to form the first bent part and by using the second bending edges to form the second part. In addition, this tool also makes it possible to form the first bent part and the second bent part at predetermined angles by using the first bending edges and the second bending edges.

Another main point of the sheet metal repair tool according to the present invention is that the distance between the first bending edge and the second bending edge of the punch and the distance between the first bending edge and the second bending edge of the die are substantially same as the thickness of the repair member or the sheet metal.

In such sheet metal repair tool, the distance between the first bending edge and the second bending edge of the punch and the distance between the first bending edge and the second bending edge of the die are substantially same as the thickness of the repair member or the sheet metal, so that the difference in level between the first bent part and the second bent part becomes substantially same as the thickness of the repair member or the sheet metal. Therefore, this tool makes it possible to ensure that the repair member is bonded to the sheet metal so that it becomes flush with the sheet metal.

Still another main point of the sheet metal repair tool according to the present invention is that either the punch or the die or both of them has/have a tapered portion in a position where the first bent part is to be formed, so that the first bent part is bent curvedly by the tempered portion.

Main points of a sheet-like member fixing device according to the present invention are: to comprise a rod-like male thread having a hook on its one end portion and a female thread into which the male thread is screwed; to tighten the female thread after passing the male thread through a hole of a sheet-like member; and to support the sheet-like member by sandwiching it between the hook and the female thread. The term "sheet-like member" used herein includes not only a sheet metal but also sheet-like resin, lumber, glass and the like.

Such sheet-like member fixing device is fixed to the sheet-like member, or the sheet-like member is fixed to the fixing device while the sheet-like member is supported by being sandwiched between the female thread and the hook, using holes formed in the sheet-like member. The hole can be formed in advance or it can be formed when the sheet-like member fixing device is used.

Another main point of the sheet-like member fixing device according to the present invention is to pass the male thread through the hole from its hook's side.

In the sheet-like member fixing device of such a structure that the male thread is passed through the hole from its hook's side, the hook is first inserted into the hole of a sheet-like member, and then the male thread is passed through the hole as a matter of course because the hook is part of the male thread.

Still another main point of the sheet-like member fixing device according to the present invention is that the hook is substantially square to the male thread.

In the sheet-like member fixing device of such a structure that the hook is substantially square to the male thread, the sheet-like member can be supported by sandwiching it between the hook and the female thread while the hook is in close contact with the back surface of the sheet-like member.

A further main point of the sheet-like member fixing device according to the present invention is that the male thread is fixed in the direction substantially perpendicular to the hook while the hook is brought in close contact with the surface of the sheet-like member.

Such sheet-like member fixing device can be easily supported by fixing the male thread in the direction substantially perpendicular to the sheet-like member while the sheet-like member is supported by being sandwiched between the hook and the female. In other words, when the sheet-like member fixing device is fixed to the sheet-like member, the sheet-like member fixing device is fixed in the direction substantially perpendicular to the sheet-like member.

Still another main point of the sheet-like member fixing device according to the present invention is that the hook points to one direction.

Since the hook does not branch off in various directions from the male thread but it points to one direction, the hook can be inserted into the hole while the sheet-like member fixing device is tilted against the sheet-like member. By a moving the device to the direction where the hook points, the hook can be easily locked in the sheet-like member. Furthermore, the sheet-like member fixing device can be easily inserted into the hole of the sheet-like member without getting stuck in the hole when the hook is inserted into the hole.

A further main point of the sheet-like member fixing device according to the present invention is that the edge of the hook fixed in the direction substantially perpendicular to the male thread is beveled.

In the sheet-like member fixing device, the edge of the hook is beveled to form a tapered tip. Therefore, the sheet-like member fixing device can be easily inserted into the hole of the sheet-like member even when the hole is small. In addition, when the sheet-like member is made of soft material, the hole is not necessarily formed in advance. In this case, the sheet-like member fixing device can be passed through the sheet-like member while piercing the member with the hook.

A still further main point of the sheet-like member fixing device according to the present invention is that a handle is provided to the other end of the male thread.

In such sheet-like material fixing device, a handle is provided to the other end of the device so that the sheet-like member can be supported by holding the device with hand or tool.

Another main point of the sheet-like member fixing device according to the present invention is that the handle is shaped like a ring.

Such sheet-like member fixing device can be easily supported by holding the ring-like handle. Furthermore, force can be easily applied to the sheet-like member by pulling out of the sheet-like member fixing device by putting a finger into the ring-like handle.

Still another main point of the sheet-like member fixing device according to the present invention is that the female thread can be screwed down by hand.

The female thread of such sheet-like member fixing device has wings that makes it easier to apply force, and therefore the female thread can be screwed down by hand.

BRIEF DESCRIPTION OF THE DRAWINGS

FIG. 1(*a*) is a side view showing a car body to be repaired, and FIG. 1(*b*) is a sectional plan view showing a part repaired by bonding a repair member.

FIGS. 4(*a*), 4(*b*), and 4(*c*) are a side view, a front view, and a plan view of the die, respectively.

FIG. 8(*a*) is a side view and FIG. 8(*b*) is a plan view.

FIG. 9(*a*) is a side view, and FIG. 9(*b*) is a plan view.

FIG. 14(*a*) is a back view, and FIG. 14(*b*) is a plan view.

FIGS. 17(*a*) and 17(*b*) are a front view and a plan view of the punch, and FIG. 17(*c*) is a plan view of the die.

FIGS. 20(*a*) and 20(*b*) are a front view and a plan view of the punch, and 20(*c*) is a plan view of the die.

FIGS. 21(*a*) and 21(*b*) are a front view and a plan view of the punch, and 21(*c*) is a plan view of the die.

FIGS. 23(*a*) and 23(*b*) are a front view and a plan view of the punch, and 23(*c*) is a plan view of the die.

FIG. 24(*a*) and FIG. 24(*b*) are a perspective view and a sectional view showing a repair member on which folds are formed, and FIG. 24(*c*) is a sectional view showing a repair member on which no folds are formed.

FIG. 25(*a*) is a plan view of the punch and the die, and FIG. 25(*b*) is a general side view of the tool.

FIGS. 26(*a*), 26(*b*), and 26(*c*) are a side view, a front view, and a bottom view, respectively.

FIGS. 29(*a*), 29(*b*), and 29(*c*) are a side view, a front view, and a bottom view, respectively.

FIGS. 30(*a*), 30(*b*), and 30(*c*) are a side view, a front view, and a bottom view, respectively.

FIG. 31(*a*) is a side view and FIG. 31(*b*) is a general front view of the tool.

FIG. 32(*a*) is a front sectional view showing a joint between the repair member and the sheet metal which is bent with the tool shown in FIGS. 31(*a*) and 31(*b*). FIG. 32(*b*) is a front sectional view showing a joint between the repair member and the sheet metal which is not bent with the tool shown in FIGS. 31(*a*) and 31(*b*). FIG. 32(*c*) is a plan view showing a coated surface of the sheet metal which is not bent with the tool shown in FIGS. 31(*a*) and 31(*b*).

FIG. 33(*a*) is a side view, and FIG. 33(*b*) is a general front view of the tool.

FIG. 40(*a*) is an enlarged front sectional view, and FIG. 40(*b*) is a bottom view of a major part of the sheet-like member.

FIG. 43(*a*) is a side view of a car body, and FIG. 43(*b*) is a perspective view showing a part repaired by bonding a repair member.

DESCRIPTION OF THE PREFERRED EMBODIMENTS

Embodiments the sheet metal repair method, the sheet metal repair tool, and the sheet-like member fixing device according to the present invention will hereinafter be described in detail with reference to the accompanying drawings.

Figure 1A:
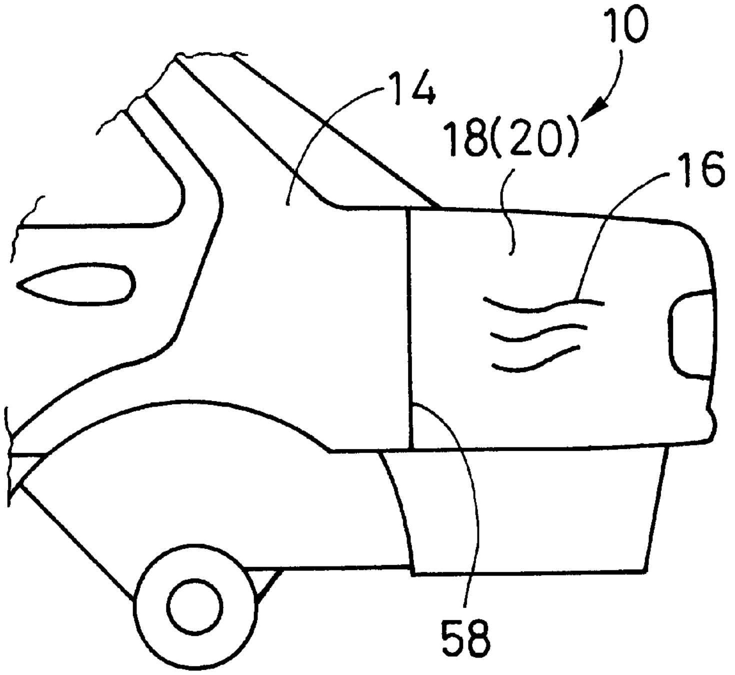
FIGS. 1(*a*) and (*b*) are views to help explain a sheet metal repair method of the present invention.
Figure 1B:
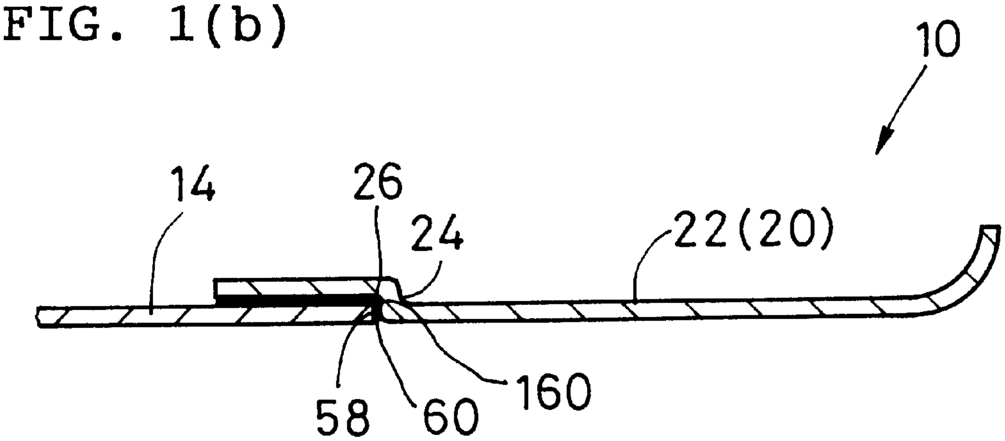
Figure 2:
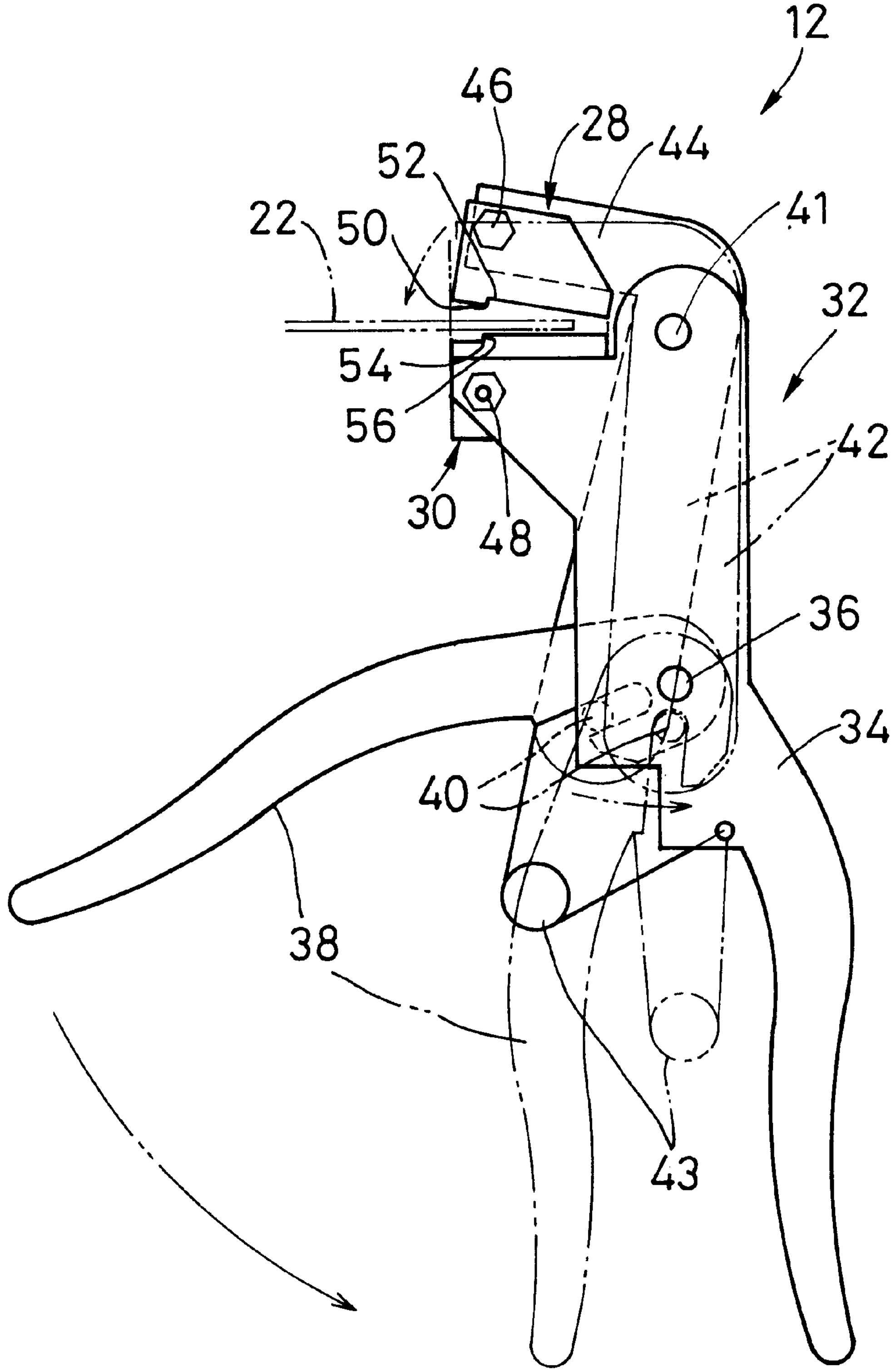
FIG. 2 is a side view showing a sheet metal repair tool of the present invention which is used in the sheet metal repair method of the present invention.
Figure 3:
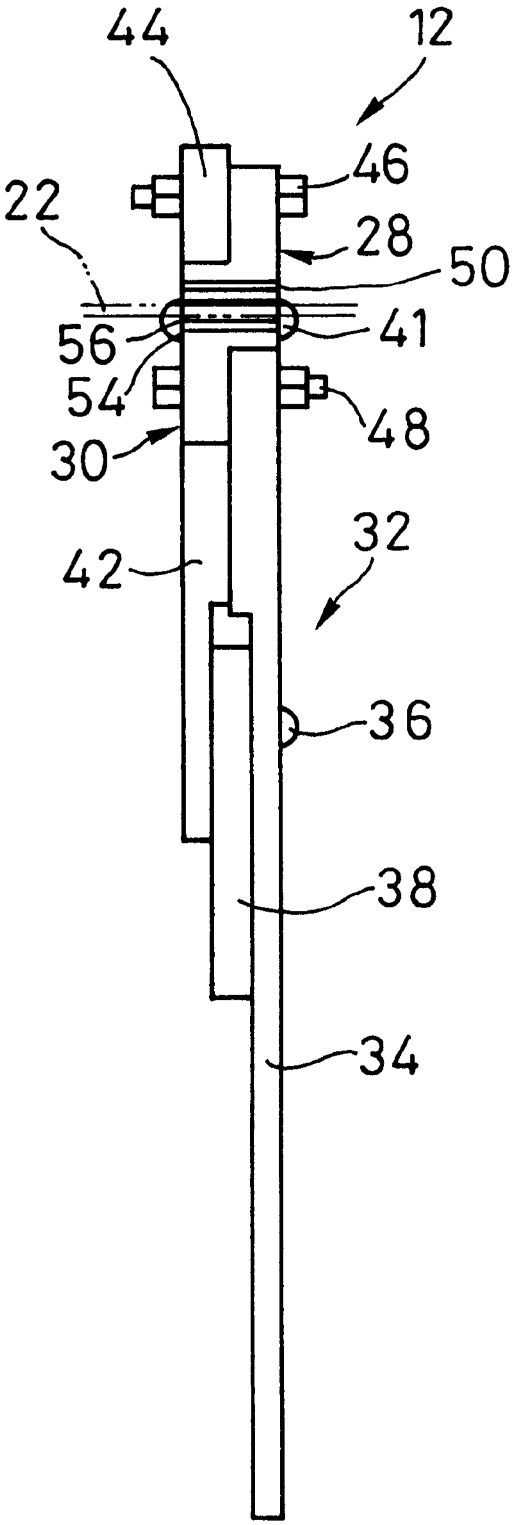
FIG. 3 is a front view showing the sheet metal repair tool shown in FIG. 2.

In FIGS. 1 to 3, the numeral 10 indicates a car body which is to be repaired by the sheet metal repair method of the present invention, and the numeral 12 indicates the sheet metal repair tool of the present invention.

The sheet metal repair tool 12 is used in the sheet metal repair method for removing a particular portion 18 including a damaged part 16 of a sheet metal 14 of a car body 10 and bonding a repair member 22 to stop up a gap 20 of the sheet metal. This tool 12 comprises a punch 28 and a die 30 for forming a first bent part 24 by bending a portion near the end part of the repair member 22 and for forming a second bent part 26 by bending a portion nearer to the end part in the direction opposite to the first bent part 24, so as to bond the repair member 22 in accordance with the shape of the gap 20 as shown in FIGS. 2 and 3.

The punch 28 and the die 30 are attached to the end of pliers 32. The pliers 32 includes a handle 34, to the end portion of which the die 30 is attached; a pivotable handle 38 which pivots about a pivot pin 36; a pin 40; and a lever element 42 which pivots about a pivot pin 41(fulcrum). The punch 28 is fixed to a portion 44 near the end of the lever element 42, that is, the point of action of the element 42. When the handle 34 and the pivotable handle 38 are brought close together by the application of griping force or pushing force, the first bent part 24 and the second bent part 26 are formed on the repair member 22 between the punch 28 and the die 30. A spring 43 is attached to the handle 34 and the pivotable handle 38 and exerts a force to cause them to move apart.

In the pliers 32, the pivotable 36 is considered as a fulcrum of the pivotable handle 38, a point of contact between the pin 40 and the handle 38 is considered as a point of action of the handle 38, the pivot pin 41 is considered as a fulcrum of the lever element 42, and the punch 28 is considered as a point of action of the lever element 42. Therefore, when the pivotable handle 38 pivots about the pivot pin 36 and a force is applied to the pin 40, the lever element 42 pivots about the pivot pin 41 and a force is applied to the repair member 22. Thus, double leverage action can be achieved in the pivot pin 38 and the lever element 42. For example, where the distance between the point of application of force of the pivotable handle 38 and the pivot pin 36 is 90 mm, the distance between the pivot pin 36 and the pin 40 is 12 mm, the distance between the pin 40 and the pivot pin 41 is 75 mm, and the distance between the pivot pin 41 and the point of action of the punch 28 is 42 mm, the force applied to the repair member 22 by the punch 28 is 13.4 times the force applied to the pivotable handle 38.

$$(90/12)*(75/42)=13.4$$

The punch 28 is detachably or attachably secured to the portion near the end portion 44 of the lever element 42 by a screw 46, and the die 30 is detachably or attachably fixed to the end portion of the handle 34 by a screw of 48. The punch 28 has a first bending edge 50 and a second bending edge 52, and the die 30 has a first bending edge 54 and a second bending edge 56. The first bending edges 50 and 54 form a first bent part 24 and the second bending edges 52 and 56 form a second bent part 26. In this case, the first bending edges 50 and 54 and the second bending edges 52 and 56 are arranged parallel with the direction of the axis of the pivot pin 36 in a line. The distance between the first bending edge 50 and the second bending edge 52 and the distance between the first bending edge 54 and the second bending edge 56 are substantially same as the thickness of the repair member 22.

Next, a sheet metal repairing method will be described below by taking a method for repairing a sheet metal 14 of a car body 10 with such sheet metal repair tool 12 as an example.

When a part of a sheet metal 14 of a car body 10 is damaged in an accident, a particular portion 18 including a damaged part 16 is cut along a cutting line 58 in a fusion process and the like, and thus removed from the car body 10. By removing the portion 18, a gap 20 is formed in the sheet metal.

Then a repair member 22 which is a bit larger in area than the gap 20 is prepared. As shown in FIGS. 2 and 3, an end portion of the repair member 22 is inserted between the punch 28 and the die 30 of the sheet metal repair tool 12, and the handle 34 and the pivotable handle 38 are griped by hand. When gripping force is thus applied to the handle 34 and the pivotable handle 38, the pivotable handle 38 pivots about the pivot pin 36 and therefore a pin 40 of the lever element 42 is pushed upwards. When the pin 40 is pushed upwards, the lever element 42 pivots about the pivot pin 41, the punch 28 is brought closer to the die 30. When the punch 28 is brought closer to the die 30, the repair member 22 is pressed by the punch 28 and the die 30. Thus, the first bent part 24 is formed by the first bending edge 50 of the punch 28 and the first bending edge 54 of the die 30, and the second bent part 26 is formed by the second bending edge 52 of the punch 28 and the second bending edge 56 of the die 30.

After the first and the second bent parts 24 and 26 are formed on the repair member 22, the portion near the second bent part 26 and the portion 57 near the end of the repair member 22 is attached to the cut 58 of the sheet metal 14, as shown in FIG. 1(*b*). At this time, a difference 160 in level formed by bending the repair member 22 is fitted to the end portion of the sheet metal 14. Since the distance between the first bending edge 50 and the second bending edge 52 and the distance between first bending edge 54 and the second bending edge 56 are substantially same as the thickness of the repair member 22, the repair member 22 is bonded flush with the sheet metal 14 of the outer surface of the car body 10. The repair member 22 is bonded to the sheet metal 14 by an adhesive agent 60, and it may also be welded if necessary. After being thus bonded to the sheet metal 14, repair member 22 is coated by a primer and then given a finish so as to hide the bonded part from view. Thus, all the repair processes are completed.

In such sheet metal repair method, the first bent part 24 and the second bent part 26 are formed by bending a portion near the end of the repair member 22, so that the repair member 22 of a substantially same shape as the gap 20 can be bonded to the sheet metal. For this reason, unlike a conventional repair method, there is no need to use a reinforcing member in the present invention, and therefore the repairing process can be simplified, and the number of repairing steps and the cost can be reduced. In addition, compared to the case where a reinforcing member is used, the number of bonded parts are reduced in the present invention, so that bonding strength and resistance to corrosion can be improved.

Furthermore, in the sheet metal repair tool 12, since the distance between the first bending edge 50 and the second bending edge 52 and the distance between the first bending edge 54 and the second bending edge 56 are substantially same as the thickness of the sheet metal 14, the difference 160 in level between the first bent part 24 and the second bent part 26 is the same as the thickness of the sheet metal 14. For this reason, when the repair member 22 is bonded to the sheet metal 14, the repair member 22 becomes flush with the sheet metal 14, so that painting can be easily conducted after bonding and outward appearance can be enhanced.

One embodiment of the present invention has thus been described, however, the present invention can also be materialized in the other embodiments.

Figure 4A:
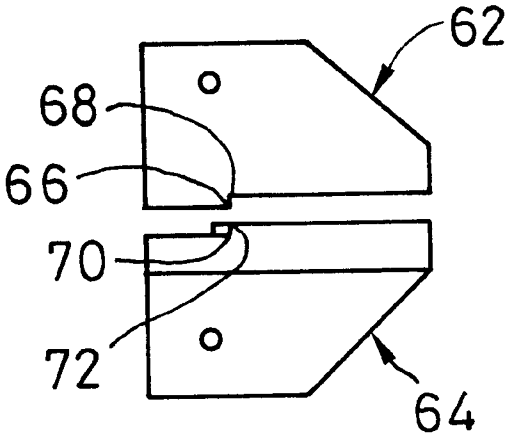
FIGS. 4(*a*) to (*c*) are views showing embodiments of the punch and the die of the sheet metal repair tool shown in FIG. 2.
Figure 4B:
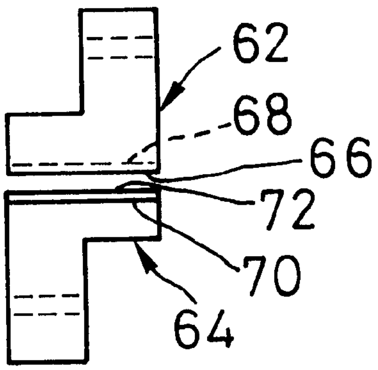
Figure 4C:
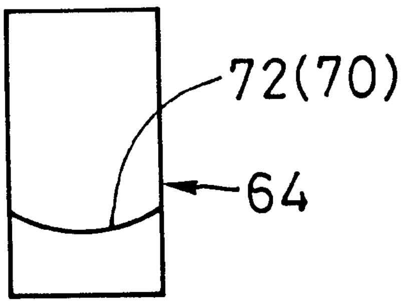

For example, the punch and the die of the sheet metal repair tool 12 of the present invention may be a punch 62 and a die 64 shown in FIG. 4. A first bending edge 66 and a second bending edge 68 of the punch 62 and a first bending edge 70 and a second bending edge 72 of the die 64 are curved in the direction substantially perpendicular to the direction to which the repair member 22 is pushed. Such punch 62 and die 64 can be useful when the part obtained by cutting a predetermined portion of the sheet metal is curved.

Figure 5:
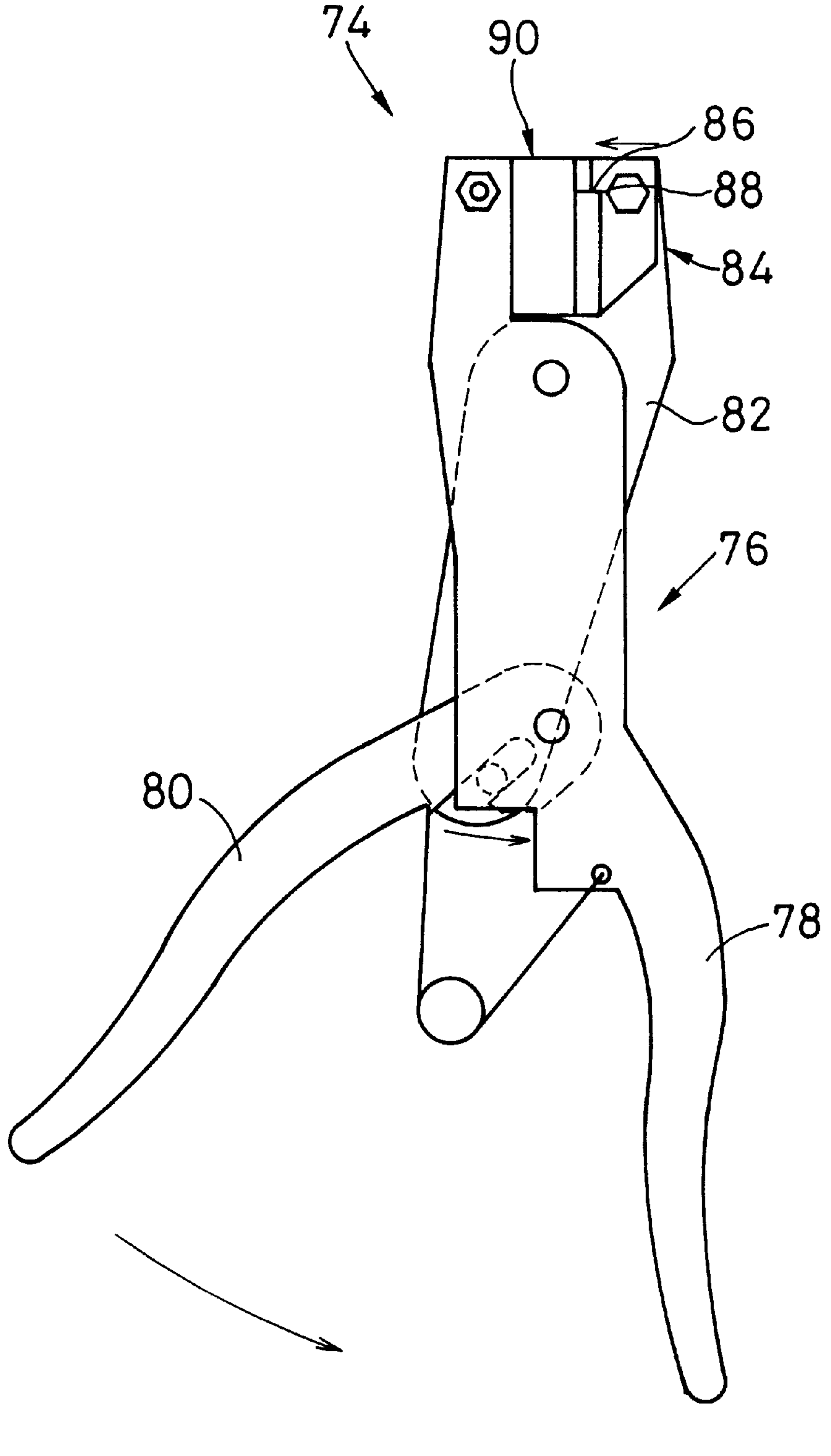
FIG. 5 is a side view showing another embodiment of the sheet metal repair tool of the present invention.
Figure 6A:
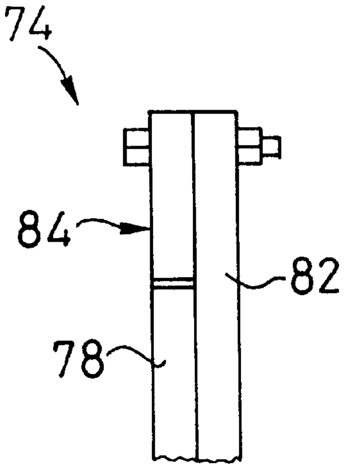
FIGS. 6(*a*) and 6(*b*) are a back view and a plan view of the sheet metal repair tool shown in FIG. 5, respectively.
Figure 6B:
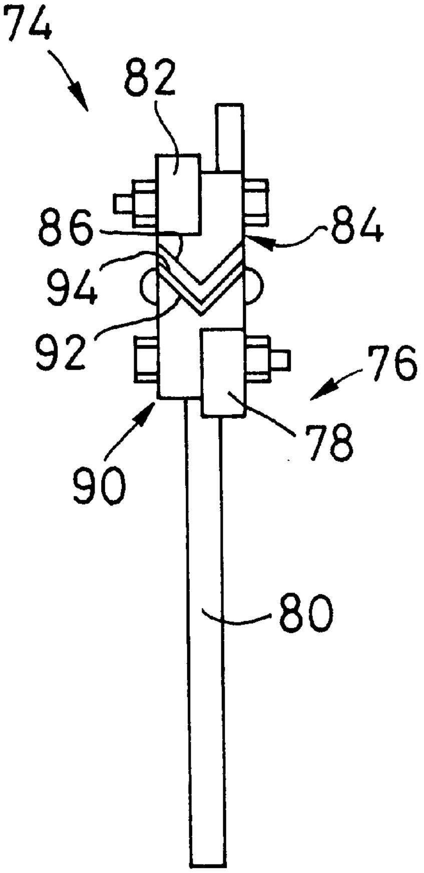
Figure 7:
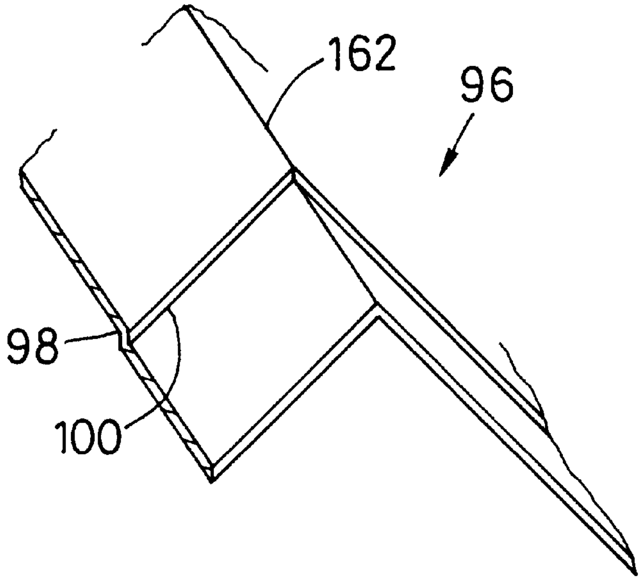
FIG. 7 is a perspective view showing a repair member, whose one portion near the end part is bent by the sheet metal repair tool shown in FIG. 5.

Alternatively, the sheet metal repair tool of the present invention may be a sheet metal repair tool 74 shown in FIGS. 5 and 6. A pair of pliers 74 of this sheet metal repair tool 74 is composed of a handle 78, a pivotable handle 80, and a lever element 82, and a force is applied to the repair member 22 in substantially the same direction as the gripping force is applied. A punch 84 has a first bending edge 86 and a second bending edge 88, both of which are right-angled bending edges, as shown in FIG. 6(*a*). A die 90 has a first bending edge 92 and a second bending edge 94, both of which are right-angled bending edges shaped to fit with the punch 84, as shown in FIG. 6(*b*). Where the cut part obtained by cutting a particular portion of the sheet metal is of a shape bent into an angle of 90 degrees, a repair member 96 having a portion 162 bent into an angle of 90 degrees is bent with the sheet metal repair tool 74 to form a first bent part 98 and a second bent part 100, so that it can be bonded to the cut part of a shape bent into an angle of 90 degrees.

Figure 8A:
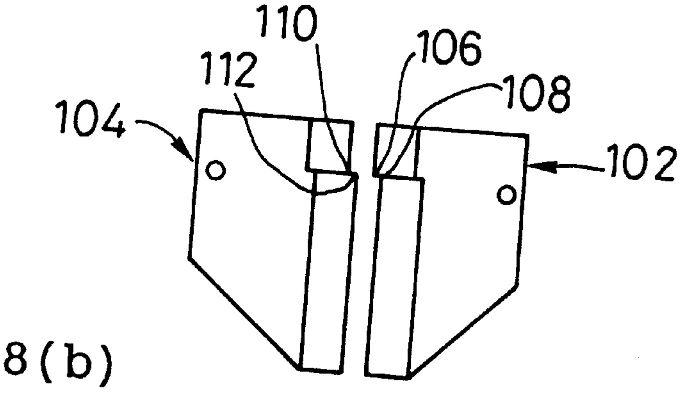
FIGS. 8(*a*) and 8(*b*) are views showing further embodiments of the punch and the die of the sheet metal repair tool shown in FIG. 5.
Figure 8B:
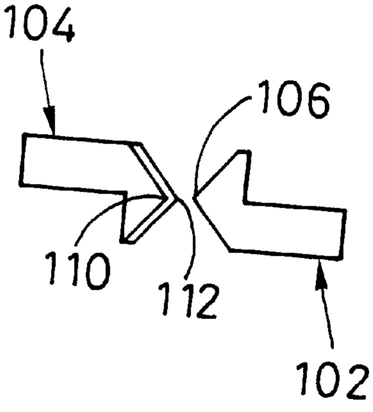

Alternatively, the punch and the die of the sheet metal repair tool 74 may be a punch 102 and a die 104 as shown in FIG. 8. The punch 102 has a first bending edge 106 and a second bending edge 108, both of which are bent into a particular angle, and the die 104 has a first bending edge 110 and a second bending edge 112, both of which are bent into a particular angle. The edge of the die 104 is angled oppositely to the edge of the punch 102. In other words, jutting parts of the punch 102 and the die 104 face each other. When the jutting part of the punch 102 is brought close to the jutting part of the die 104, only a particular portion of a repair member can be bent. Thus, the particular portion of a repair member can be easily and reliably bent by concentrating a force onto the particular portion.

Figure 9A:
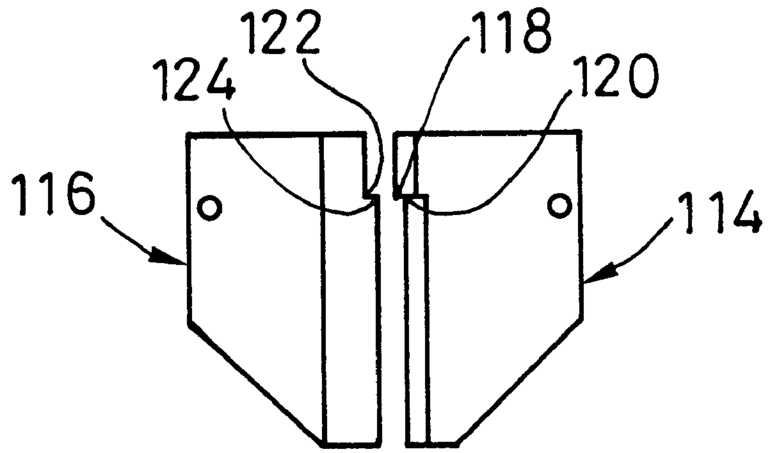
FIGS. 9(*a*) and 9(*b*) are views showing still further embodiments of the punch and the die of the sheet metal repair tool shown in FIG. 5.
Figure 9B:
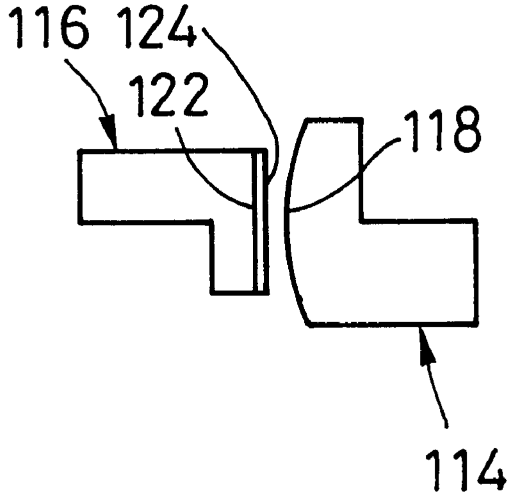

Alternatively, the punch and the die of the sheet metal repair tool 74 may be a punch 114 and a die 116 as shown in FIG. 9. The punch 114 has a first bending edge 118 and a second bending edge 120 which are curved, and the die 116 has a first bending edge 122 and a second bending edge 124 which are straight. When the jutting part of the punch 114 having a curved edge is brought close to the first and the second bending edges of the die 116 having a straight edge, a certain range of a repair member can be bent. Furthermore, the repair member can be easily and reliably bent by concentrating a force onto the center portion of the curved edge.

Figure 10:
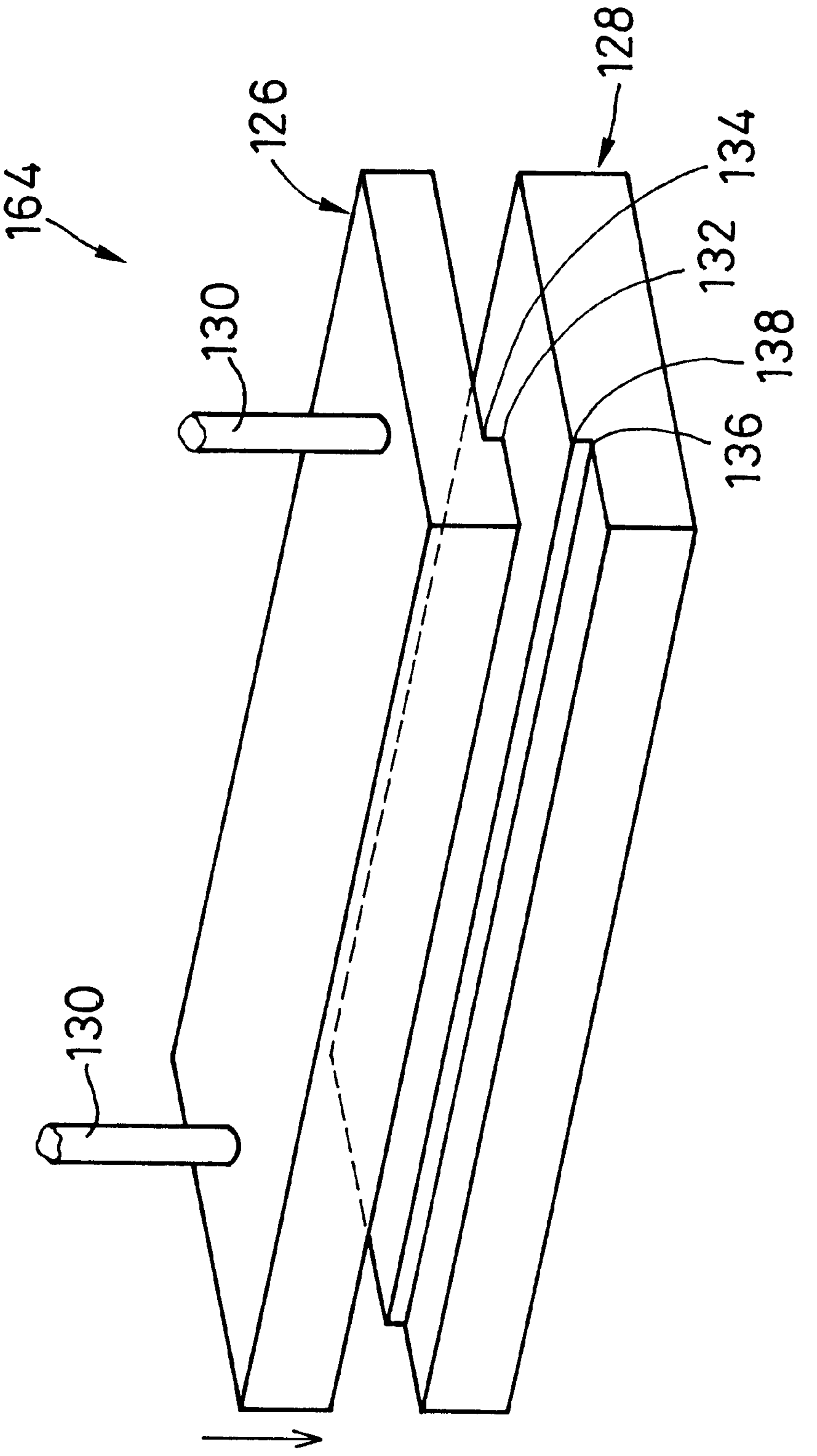
FIG. 10 is a perspective view showing another embodiment of the punch and the die of the sheet metal repair tool of the present invention.
Figure 11:
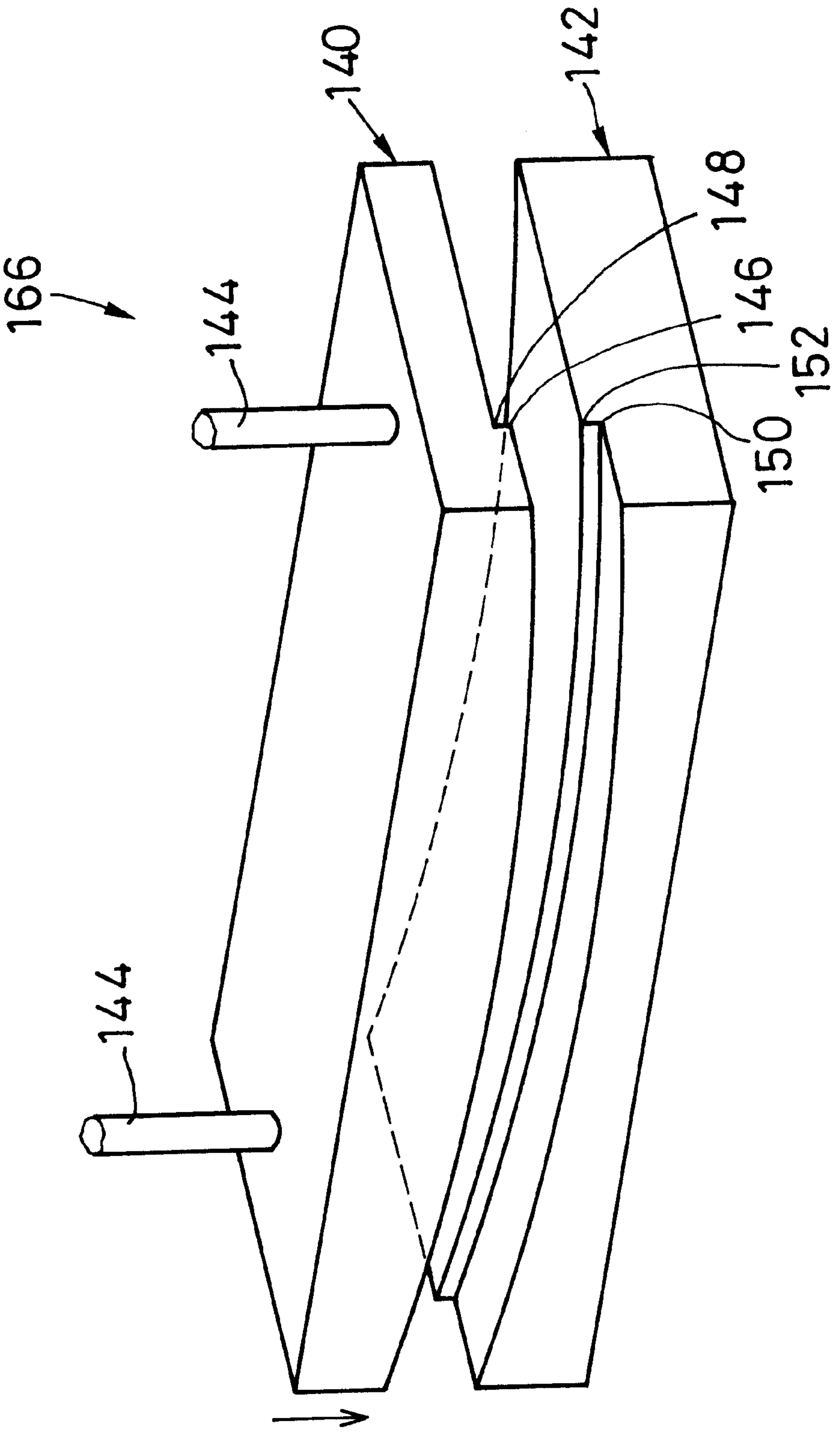
FIG. 11 is a perspective view showing still another embodiment of the punch and the die of the sheet metal repair tool of the present invention.

The sheet metal repair tool of the present invention is not limited to the one whose punch and die are manually brought close to each other. For example, as shown in FIG. 10, the sheet metal repair tool may be a sheet metal repair tool 164 whose punch 126 is brought close to a die 128 by moving pistons 130 by a hydraulic or an air cylinder. The punch 126 has a first bending edge 132 and a second bending edge 134 which are straight, and the die 128 has a first bending edge 136 and a second bending edge 138 which are straight. By using such punch 126 and die 128, a portion near the end of a repair member can be easily and reliably bent by a cylinder. In addition, the punch 126 and the die 128 is wide, so that a wide range of the repair member can be bent at a time.

Alternatively, the sheet metal repair tool may be a sheet metal repair tool 166 whose punch 140 is brought close to a die 142 by moving pistons 144 by a hydraulic or an air cylinder. The punch 140 has a first bending edge 146 and a second bending edge 148 which are curved, and the die 142 has a first bending edge 150 and a second bending edge 152 which are curved. The punch 140 and the die 142 are used for repairing a curved car body and the like.

Figure 12:
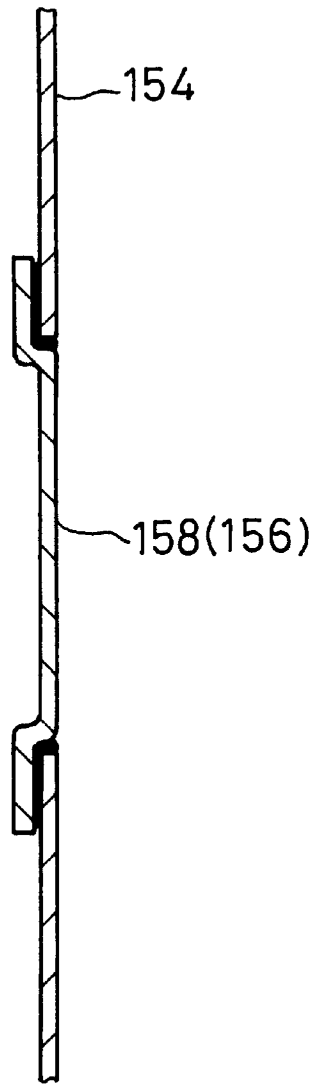
FIG. 12 is a view to help explain another embodiment of the sheet metal repair method of the present invention, and it is a sectional view of the joint between the sheet metal and the repair member.

The sheet metal repair method of the present invention is not limited to the method for bending only one end of a repair member as shown in FIG. 1, but it may be a method for bending both ends or a periphery of a repair member. For example, as shown in FIG. 12, where a gap 156 formed by removing a particular portion from a sheet metal 154 is of a round shape, the periphery of the repair member 158 may be bent with the sheet metal repair tool of the present invention and then the repair member 158 may be bonded to the metal sheet in such a manner that the repair member 158 stops up the gap 156.

Figure 13:
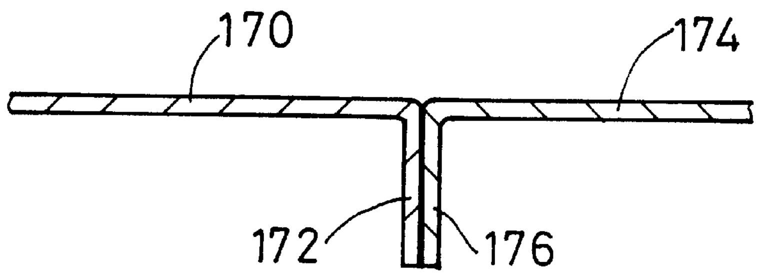
FIG. 13 is a view to help explain still another embodiment of the sheet metal repair method of the present invention, and it is a sectional view of the connection between the sheet metal and the repair member.

Alternatively, in the sheet metal repair method of the present invention, both a portion near the end of a repair member and a portion near the end of a sheet metal may be bent. For example, as shown in FIG. 13, not only a portion 172 near the end of a repair member 170 but also a portion 176 near the end of a sheet metal 174 may be bent into a normal angle so as to bond the portion 172 to the portion 176.

Figure 14A:
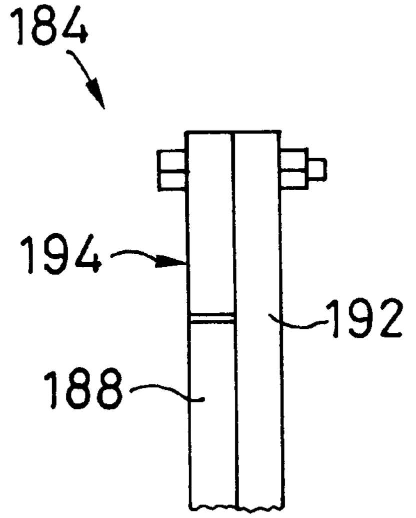
FIGS. 14(*a*) and (*b*) are views showing further embodiments of the sheet metal repair tool of the present invention.
Figure 14B:
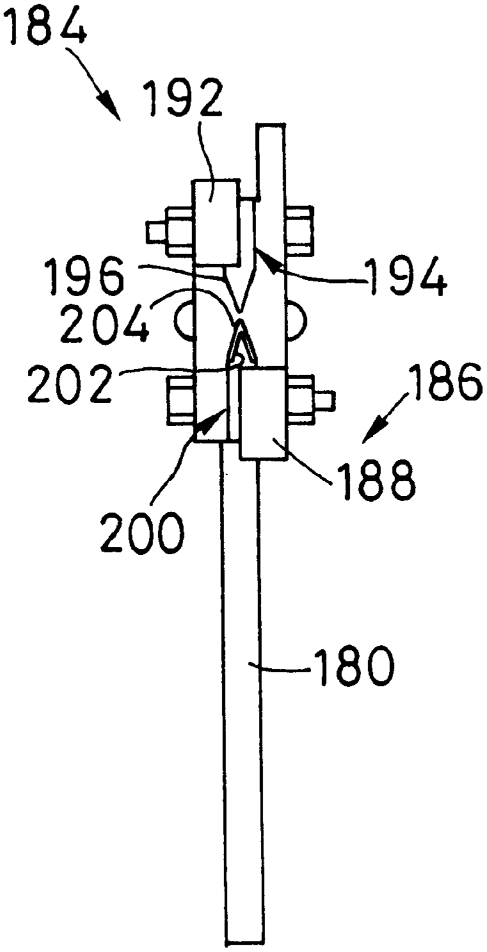

The sheet metal repair tool of the present invention may be a sheet metal repair tool 184 as shown in FIGS. 14(*a*) and 14(*b*). A pair of pliers 186 of this sheet metal repair tool 184 is composed of a handle 188, a pivotable handle 190, and a lever element 192, and a force is applied to the repair member 22 in substantially the same direction as the gripping force is applied. As shown in FIG. 14(*b*), the punch 194 has a first bending edge 196 and a second bending edge (not shown), each of which has a sharply-angled edge. As shown in FIG. 14(*b*), the die 200 has a first bending edge 202 and a second bending edge 204, each of which has a sharply-angled edge which is angled oppositely to the edge of the punch 194. Such sheet metal repair tool 184 makes it possible to bend a repair member of a shape bent into an acute angle when the part obtained by cutting a predetermined portion of the sheet metal is of a shape bent into an acute angle. Alternatively, where a part obtained by cutting a particular portion of the sheet metal is of a shape bent into a normal angle, it can be bent by sandwiching the tip of that portion between the punch 194 and the die 196. FIG. 14(*b*) is drawn on a scale of one to two. In FIG. 14(*b*), widths of the punch 194 and the die 196 may be 1 mm, 2 mm, 3 mm 4 mm, 5 mm, 6 mm, 7 mm, 8 mm or the like and are not particularly limited. The angles of the tips of the punch 194 and the die 196 may be 10°, 15°, 20°, 25°, 30°, 35°, 40°, 45°, 50°, 55°, 60°or the like, and are not particularly limited.

Figure 15:
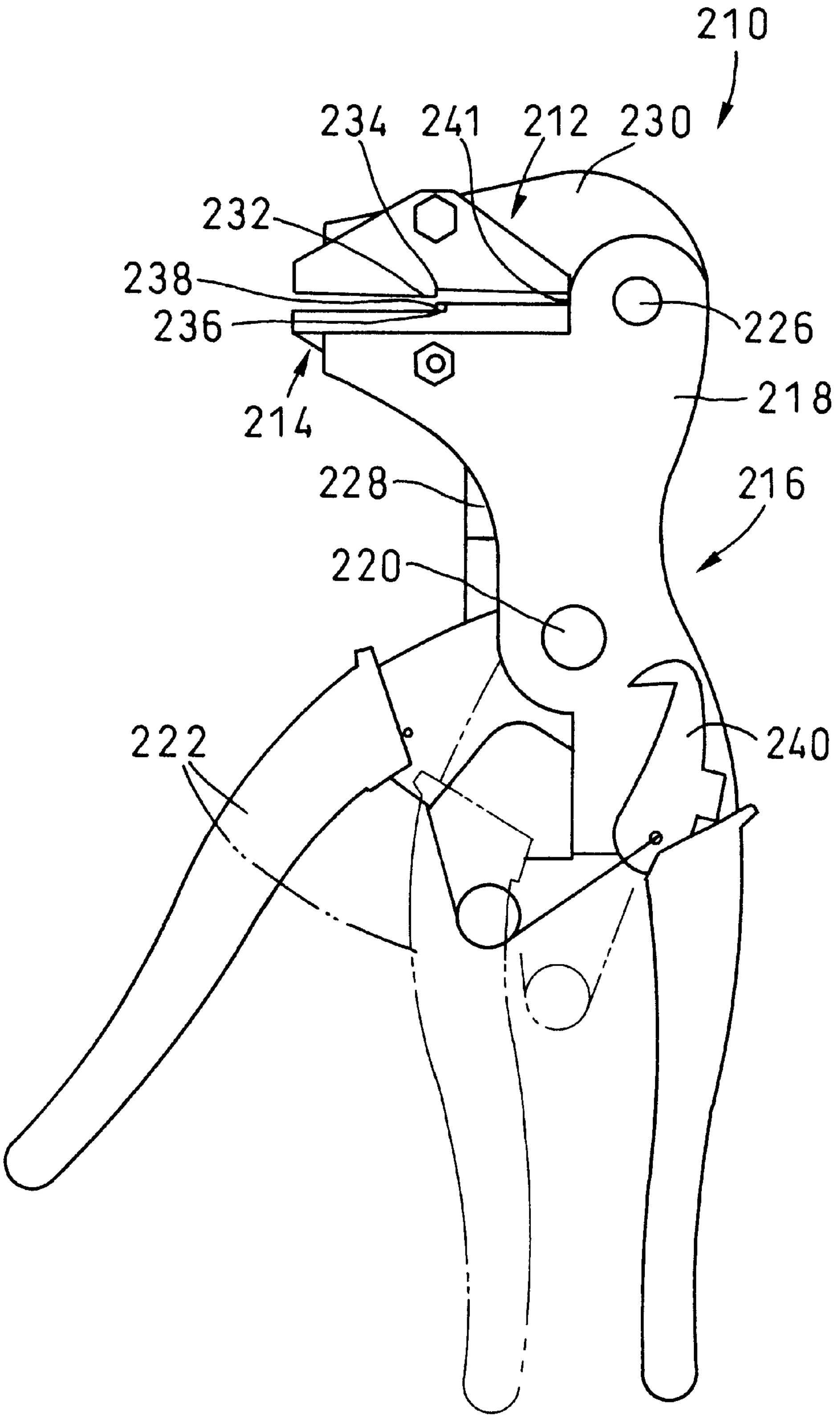
FIG. 15 is a side view showing a still further embodiment of the sheet metal repair tool of the present invention.
Figure 16:
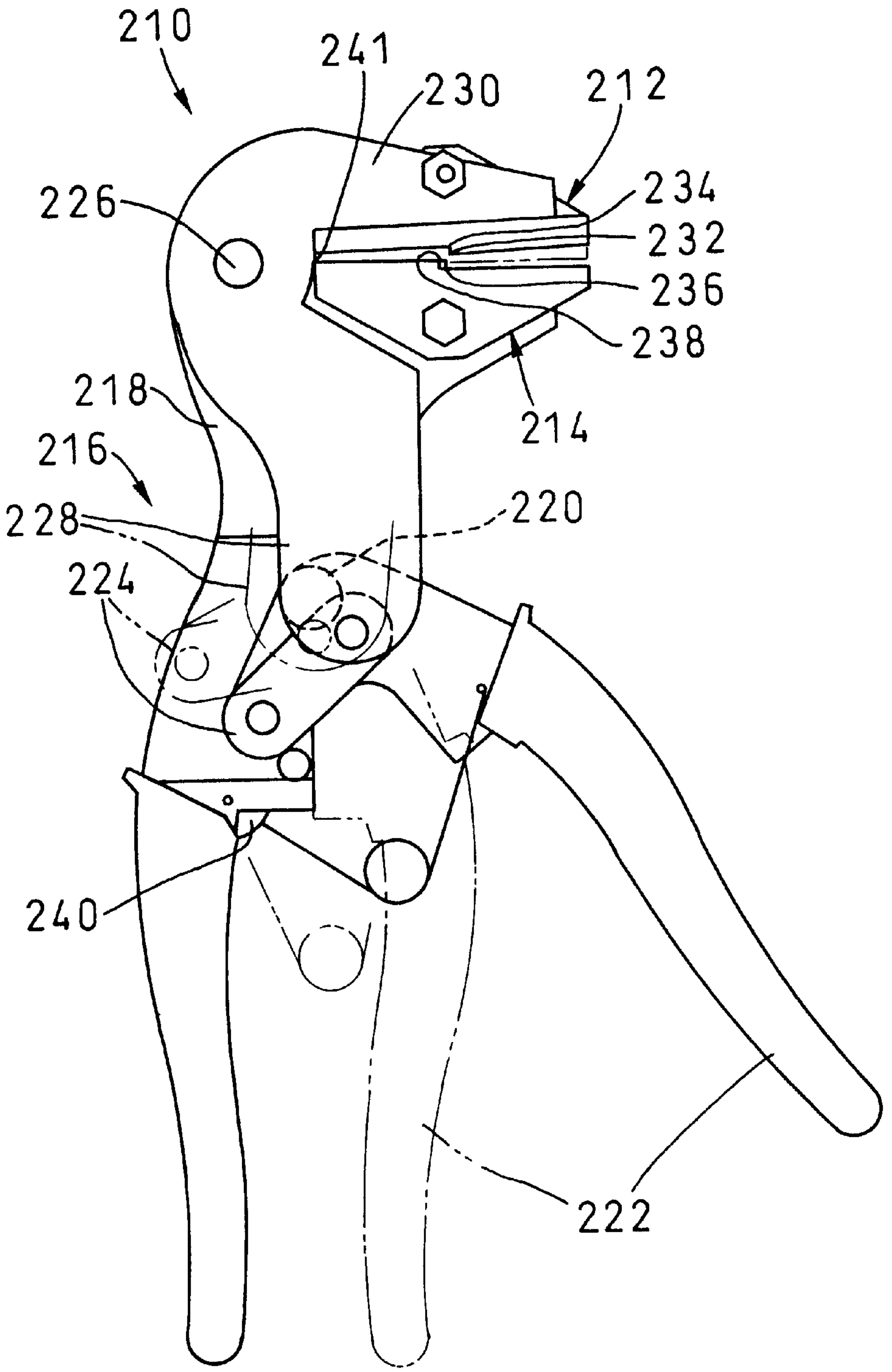
FIG. 16 is a side view of the opposite side of the sheet metal repair tool of the present invention.
Figure 17A:
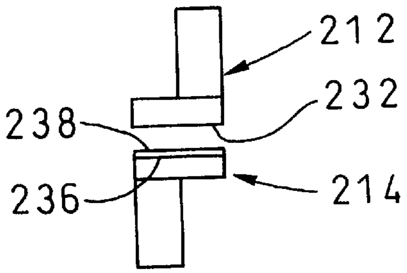
FIGS. 17(*a*) to 17(*c*) are views showing a punch and die of the sheet metal repair tool shown in FIG. 15.
Figure 17B:
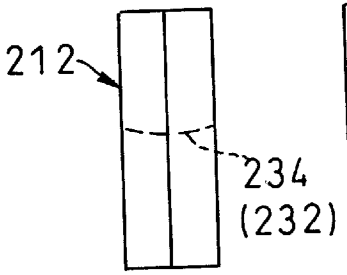
Figure 17C:
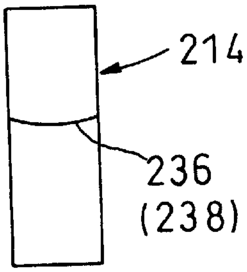

The sheet metal repair tool of the present invention may be a sheet metal repair tool 210 as shown in FIGS. 15 and 16. In this repair tool 210, a punch 212 and a die 214 are attached to the ends of pliers 216. The pliers 216 includes a handle 218, to the end portion of which the die 214 is attached; a pivotable handle 222 which pivots about a pivot pin 220; and a lever element 228 which pivots about a pivot pin (fulcrum) 226 by being pulled up by a link 224 when the pivotable handle 222 pivots about the pin 220. In addition, the punch 212 is fixed to an end portion (point of action) of a the lever element 228. As shown in FIGS. 17(*a*) to 17(*c*), a first bending edge 232 and a second bending edge 234 of the punch 212 and a first bending edge 236 and a second bending edge 238 of the die 214 are curved parallel to each other. In addition, this tool has a latch 240 for holding the handle 222 closed. Proper positioning can be achieved by pushing the repair member 22 until it goes to the end 241 of a recess.

Figure 18:
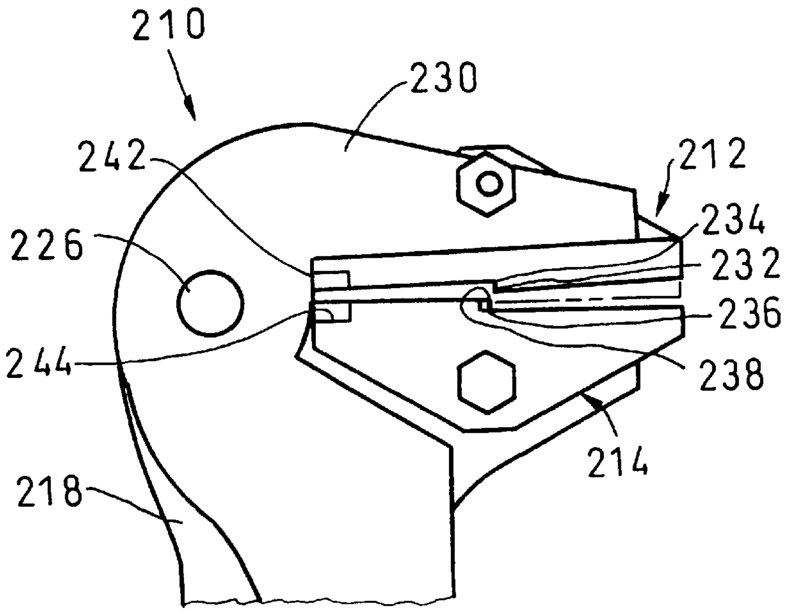
FIG. 18 is a view showing another embodiment of the punch and the die of the sheet metal repair tool shown in FIG. 15.

In the sheet metal repair tool 210, the punch 212 and the die 214 have cavities 242 and 244, respectively, as shown in FIG. 18. The cavities 242 and 244 may prevent the contact with the repair member 22 when the tool 210 is moved while the repair member is being sandwiched between the punch and the die.

Figure 19:
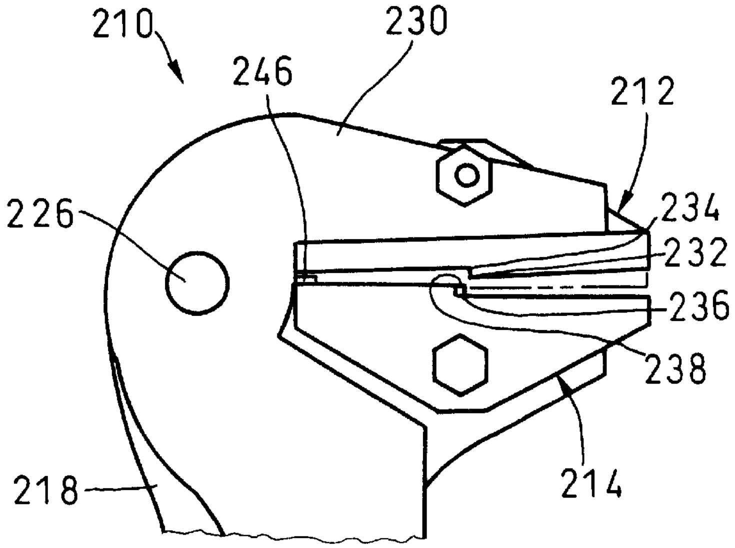
FIG. 19 is a view showing still another embodiment of the punch and the die of the sheet metal repair tool shown in FIG. 15.

As shown in FIG. 19, the sheet metal repair tool 210 may have a stopper 246 on a position where the punch 212 and the die 214 face each other. The stopper 246 may secure a certain space between the punch 212 and the die 214, which avoids the deformation or damage of the repair member 22.

Figure 20:
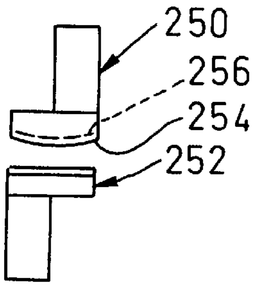
FIGS. 20(*a*) to 20(*c*) are views showing further embodiments of the punch and the die of the sheet metal repair tool shown in FIG. 15.
Figures 20B, 20C:
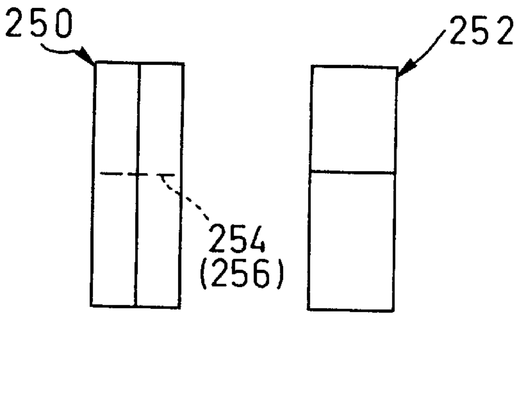

The sheet metal repair tool 210 may comprise a punch 250 and a die 252 as shown in FIGS. 20(*a*) to (*c*). The punch 250 has a first bending edge 254 and a second bending edge 256 which are curved, and the punch itself juts downward. The punch 250 and the die 252 are so configured that a pushing force is concentrated to the center portion of the punch 250 when the repair member 22 is pinched between the punch 250 and the die 252. The punch 250 and the die 252 may have cavities 242 and 244, respectively. In addition, the tool 210 may comprise a stopper 246.

Figure 21A:
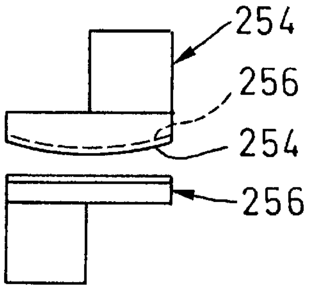
FIG. 21 are views showing still further embodiments of the punch and the die provided for the sheet metal repair tool shown in FIG. 15.
Figure 21B:
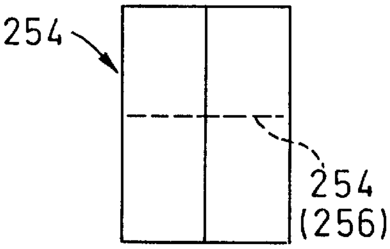
Figure 21C:
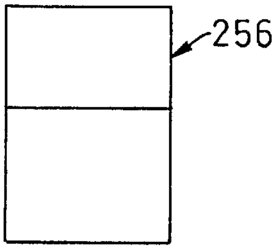

The sheet metal repair tool 210 may comprise a punch 254 and a die 256 as shown in FIGS. 21(*a*) to 21(*c*). The punch 254 and the die 256 are shaped like the punch 250 and the die 252, but they are wider than the punch 250 and the die 252. The punch 254 and the die 256 may have cavities 242 and 244, respectively. In addition, the tool 210 may comprise a stopper 246.

Figure 22:
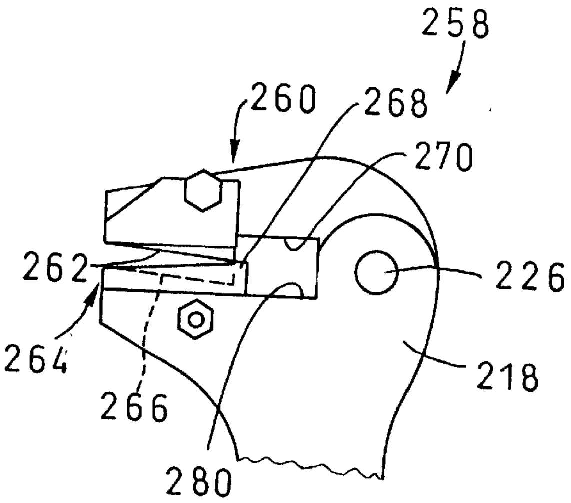
FIG. 22 is a side view showing another embodiment of the sheet metal repair tool of the present invention.
Figure 23A:
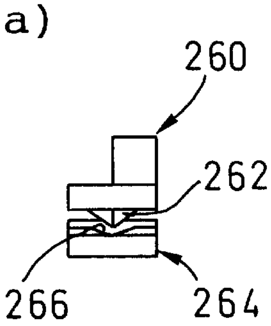
FIGS. 23(*a*) to 23(*c*) are views showing the punch and the die of the sheet metal repair tool shown in FIG. 15.
Figure 23B:
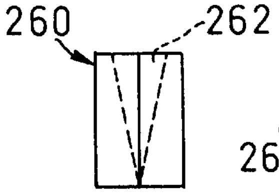
Figure 23C:
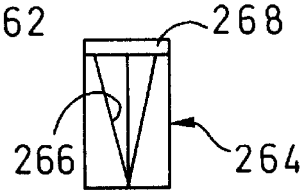

The sheet metal repair tool of the present invention may be a sheet metal repair tool 258 as shown in FIG. 22. In the sheet metal repair tool 258, the punch 260 comprises a downwardly-jutting triangular pyramid 262, while the die 262 comprises a recess 266 into which the triangular pyramid 262 fits, as shown in FIG. 23. The die 262 also comprises a jutting part 268 for positioning the repair metal 22. In such sheet metal repair tool 258, cavities 270 and 272 are formed by attaching the punch 260 and the die 264 to the pliers. The punch 260 and the die 262 may also have cavities 242 and 244, respectively. In addition, the punch 260 and the die 264 may comprise a stopper 246.

Figure 24A:
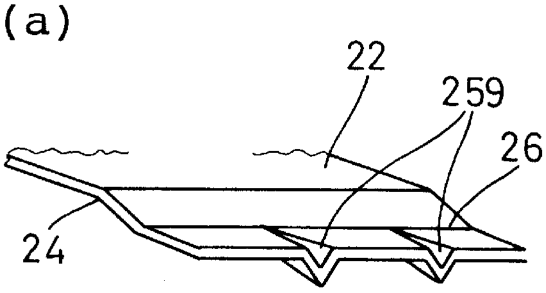
FIGS. 24(*a*) to 24(*c*) are views showing a repair member which is bent with the sheet metal repair tool shown in FIGS. 23(*a*) to 23(*c*).
Figure 24B:
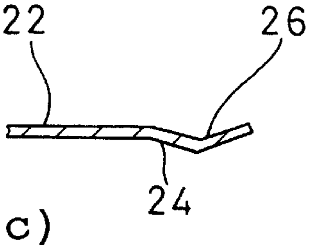
Figure 24C:
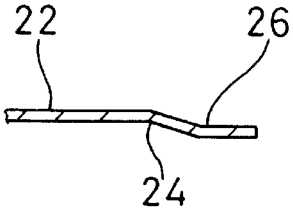

Such sheet metal repair tool 258 can be used to form folds 259 on the repair member 22 as shown in FIG. 24(*a*). Therefore, distortions produced in the bending process as shown in FIG. 24(*b*) are corrected as shown in FIG. 24(*c*) to make the tip portion of the repair member 22 parallel to the portion which is not bent. Such a step of forming folds is conducted after sanding the surfaces of the repair member 22 and the sheet metal 14 so as to promote their adhesion, bending the repair member with the sheet metal repair tool 12 shown in FIG. 2 and the like, and then forming a first bent part 24 and a second bent part 26.

Figure 25A:
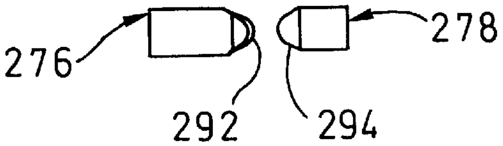
FIGS. 25(*a*) and 25(*b*) are views showing further embodiments of the sheet metal repair tool of the present invention.
Figure 25B:
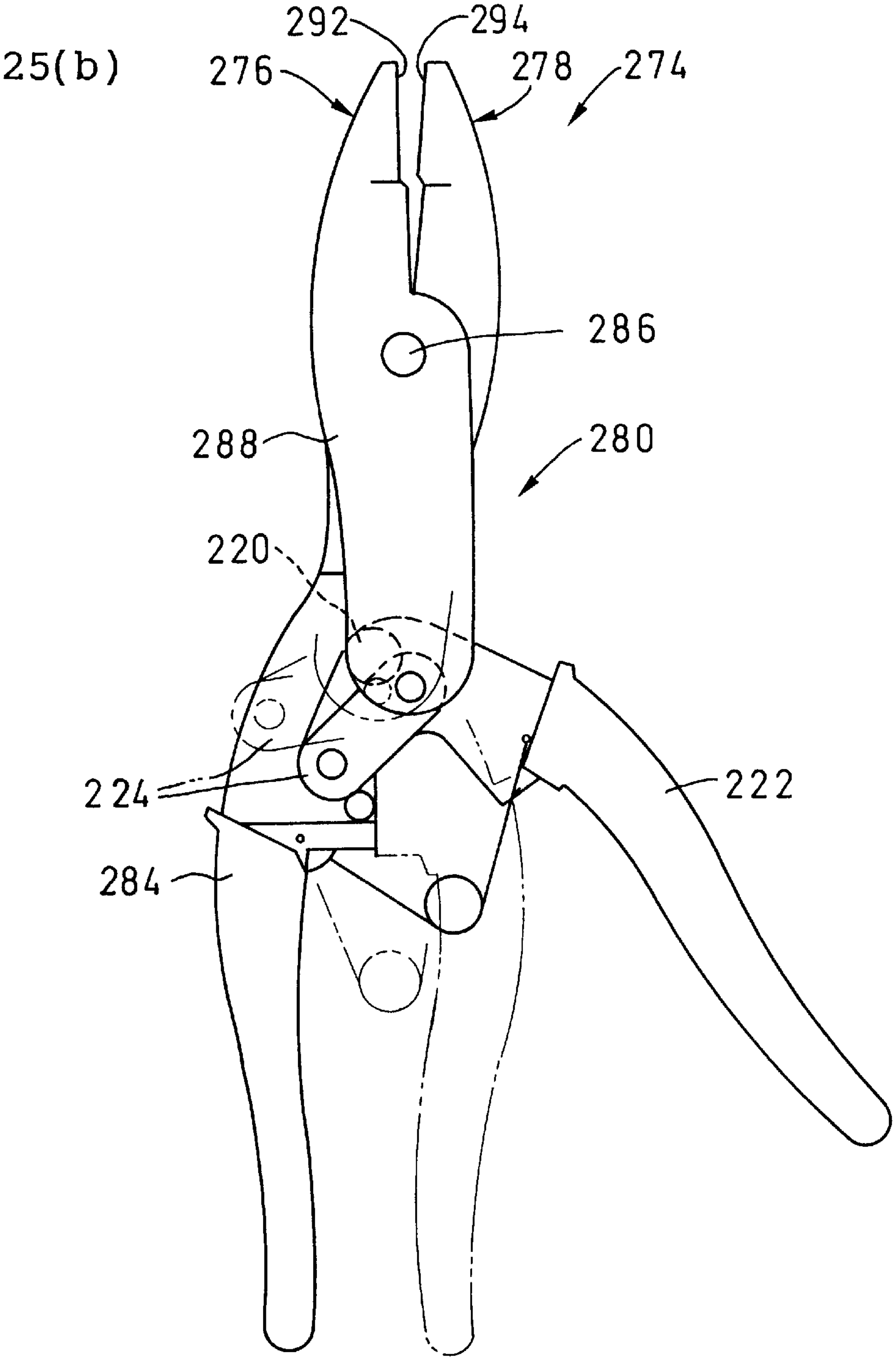

The sheet metal repair tool of the present invention may be a sheet metal repair tool 274 as shown in FIG. 25. In this repair tool 274, a punch 276 and a die 278 are integral with pliers 280. The pliers 280 includes a handle 284, to the end portion of which the die 278 is attached; a pivotable handle 222 which pivots about a pivot pin 220; and a lever element 288 which pivots about a pivot pin (fulcrum) 286 by being pulled up by a link 224 when the pivotable handle 222 pivots about the pin 220. The punch 276 and the die 278 are so configured that the repair member 22 can be pinched between jutting parts 292 and 294. The punch 276 and the die 278 may have cavities 242 and 244, respectively. In addition, the punch 276 and the die 278 may comprise a stopper 246.

In the sheet metal repair tool of the present invention, the closing and opening of the punch and the die may be carried out by an air cylinder or a hydraulic cylinder. In this case, a piston of the air cylinder or the hydraulic cylinder may be attached to the punch or the die for opening and closing of the punch and the die. Alternatively, the opening and closing of the punch and the die may be carried out by rotating a pivotable handle by the air cylinder or the hydraulic cylinder.

Figure 26A:
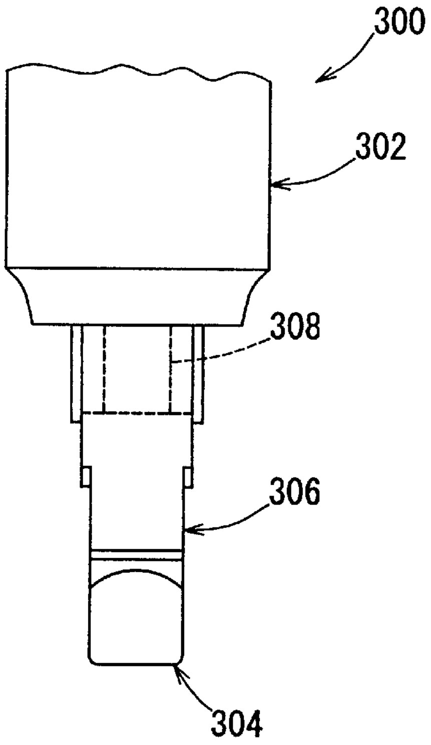
FIGS. 26(*a*) to 26(*c*) are views showing still further embodiments of the sheet metal repair tool of the present invention.
Figure 26B:
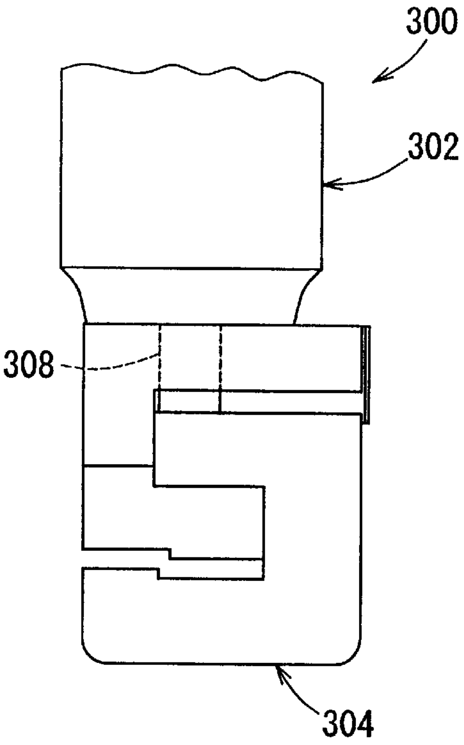
Figure 26C:
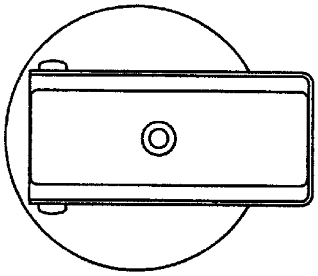
Figure 27:
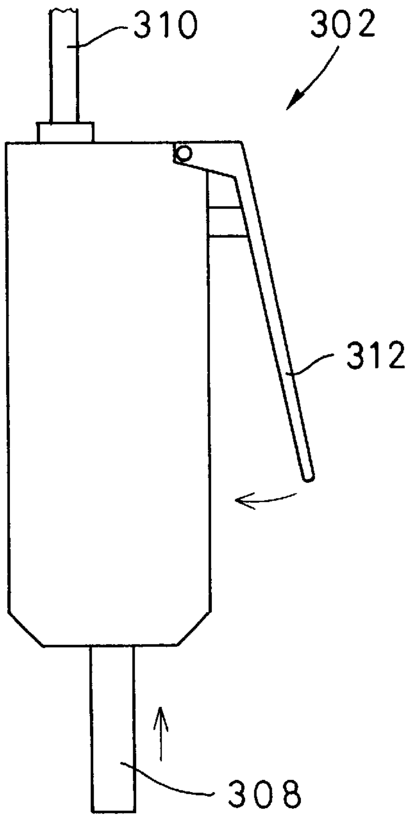
FIG. 27 is a side view showing a reciprocating drive of the sheet metal repair tool shown in FIGS. 26(*a*) to 26(*c*).
Figure 28:
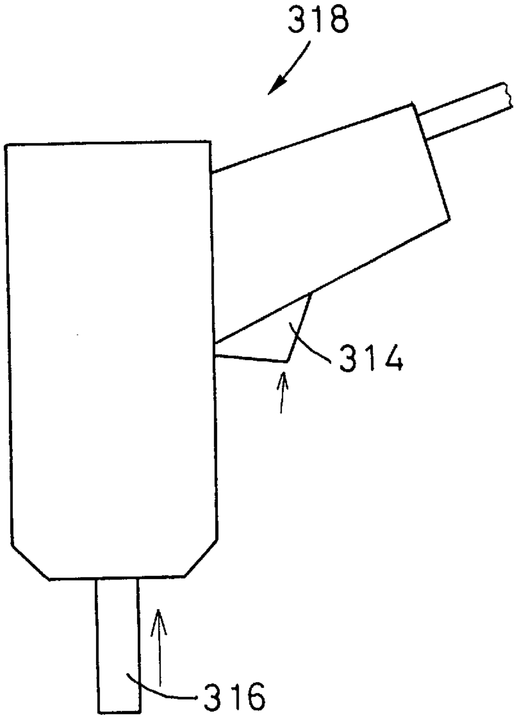
FIG. 28 is a side view showing another embodiment of the reciprocating drive of the sheet metal repair tool shown in FIGS. 26(*a*) to 26(*c*).

For example, the sheet metal repair tool of the present invention may be a sheet metal repair tool 300 as shown in FIGS. 26(*a*) to 26(*c*). In the sheet metal repair tool 300, a punch 304 is brought away from or close to a die 306 by an air-pressure reciprocating drive 302 shown in FIG. 27. The tool 300 bends a sheet metal automatically as in the case of the sheet metal repair tool 210 shown in FIG. 19. The punch 304 is fixed to a piston 308 of the reciprocating drive 302, and the die 306 is slidably fit into the piston 308. The reciprocating drive 302 used herein is commercially available. In this drive, air is inhaled from an air supply unit 310, and the piston 308 is pulled up by pressing down a lever 312. Specifically, the punch 304 is brought close to the die 306 by pressing down the lever 312. As a substitute for the reciprocating drive 302, a reciprocating drive 318 shown in FIG. 28, in which a piston 316 is pulled up by pressing down a lever 314, can be used. Alternatively, in such a reciprocating drive, a die can be brought close to a punch by pressing down a lever and pulling up a piston. It is considered that such a construction in which piston is pulled up by pressing down a lever makes a reciprocating drive more compact and increases pressing force. Alternatively, the sheet metal repair tool 300 may comprise a cover which cover the punch 304 and the die 306 and in which the punch 304 is slidable so that the punch 304 moves reliably to a position parallel to itself.

Figure 29A:
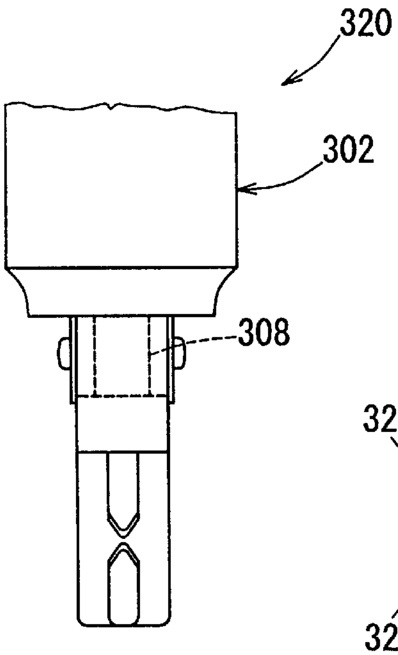
FIGS. 29(*a*) to 29(*c*) are views showing further embodiments of the sheet metal repair tool of the present invention.
Figure 29B:
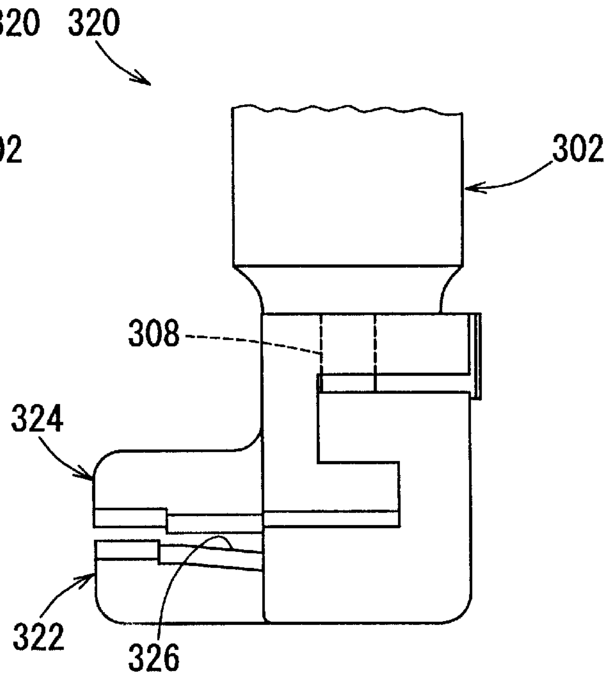
Figure 29C:
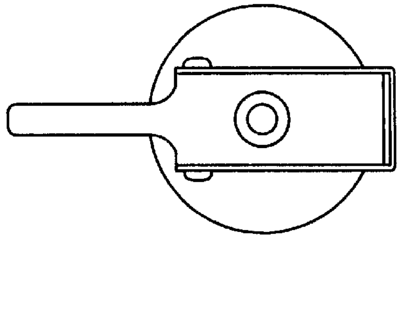

Alternatively, the sheet metal repair tool can be a sheet metal repair tool 320 as shown in FIGS. 29(*a*) to 29(*c*). In this repair tool 320, a punch 322 is brought away from and close to a die 324 by the reciprocating drive 302, and a sheet metal can be automatically bent as in the case of the sheet metal repair tool 276 shown in FIG. 25. In such sheet metal repair tool 320, when the repair member 22 is pinched between a punch 322 and a die 324, the punch 32 is brought close to the die 324 from its back toward the front. For this reason, a recess 326 is provided to the back of the punch 322 so as to reliably bend the repair member 22.

Figure 30B:
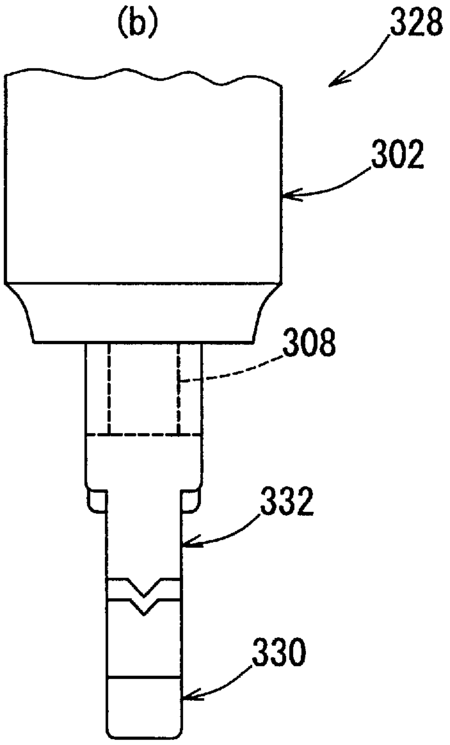
FIGS. 30(*a*) to 30(*c*) are views showing still further embodiments of the sheet metal repair tool of the present invention.
Figure 30A:
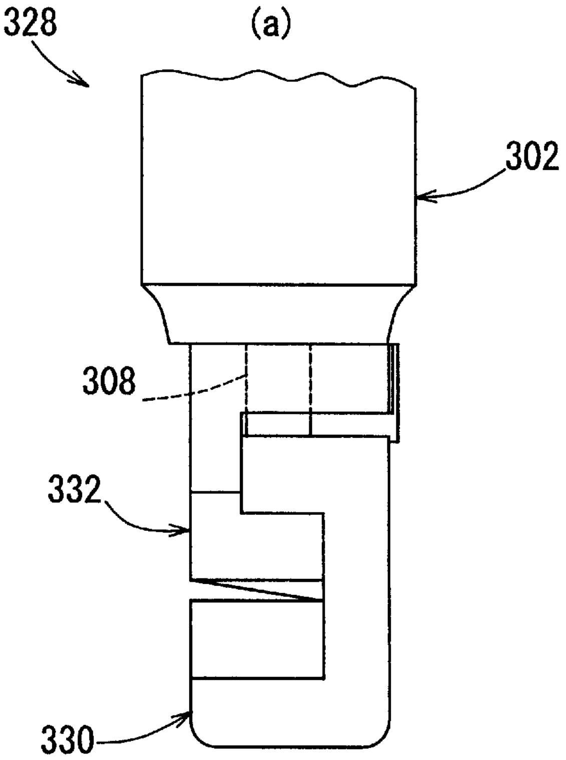
Figure 30C:
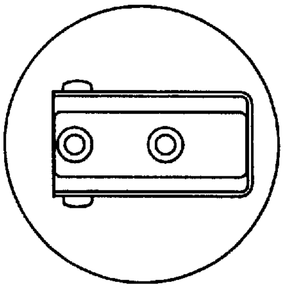

Alternatively, the sheet metal repair tool can be a sheet metal repair tool 328 as shown in FIGS. 30(*a*) to 30(*c*). In this repair tool 328, a punch 330 is brought away from and close to a die 332 by the reciprocating drive 302, and folds can be automatically formed on a repair member as in the case of the sheet metal repair tool 258 shown in FIG. 22.

Figure 31A:
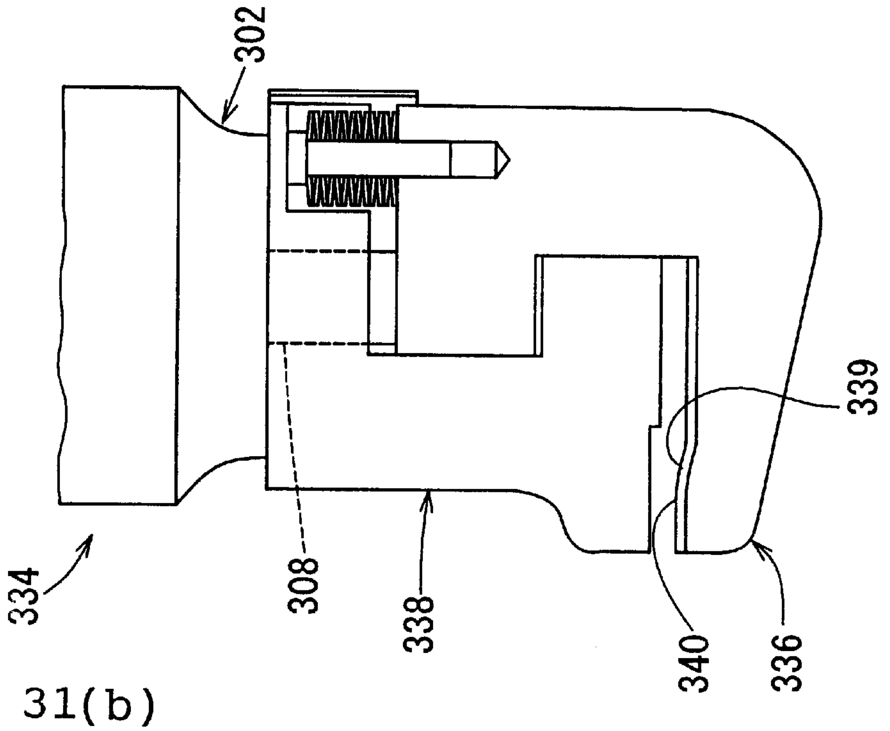
FIGS. 31(*a*) and 31(*b*) are views showing further embodiments of the sheet metal repair tool of the present invention.
Figure 31B:
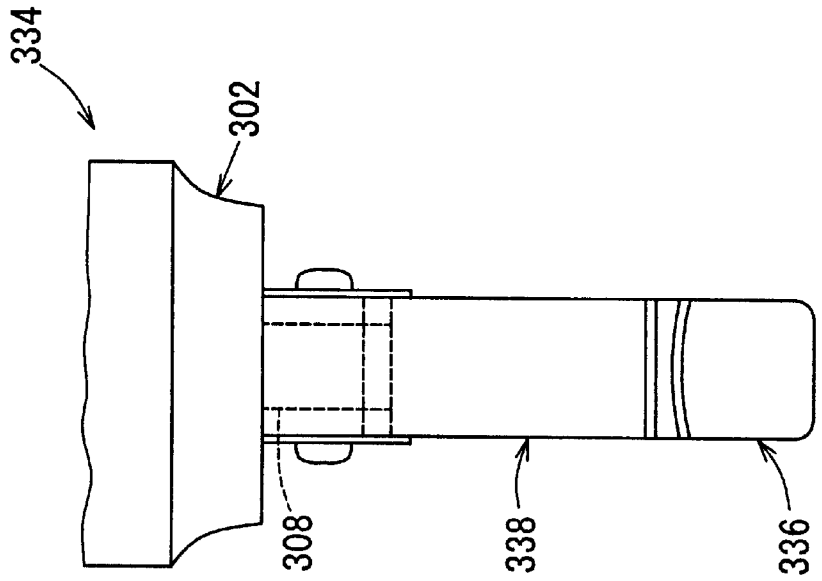
Figure 32A:
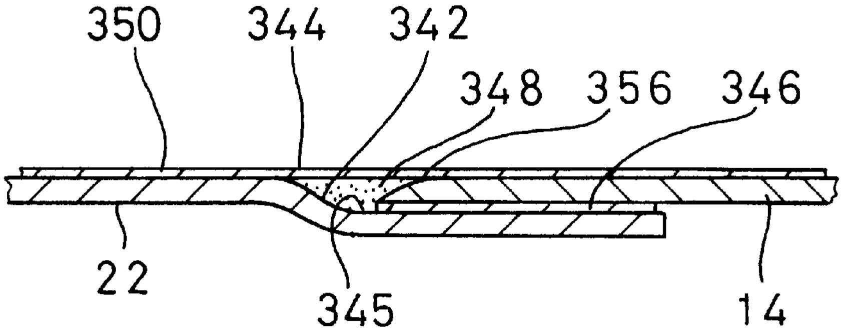
FIGS. 32(*a*) to 32(*c*) are views of the sheet metal repair tool shown in FIGS. 31(*a*) and 31(*b*) of the present invention, which is being used.
Figure 32B:
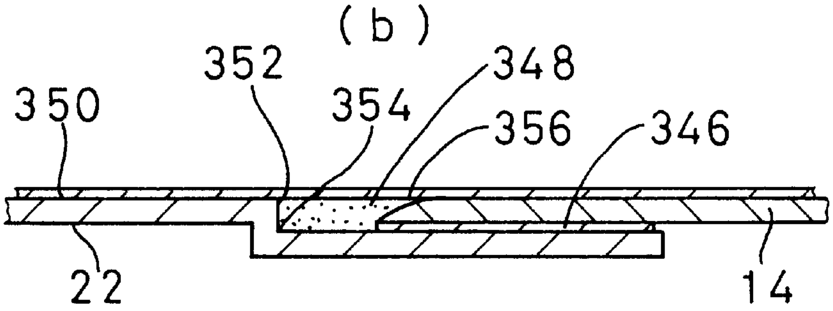
Figure 32C:
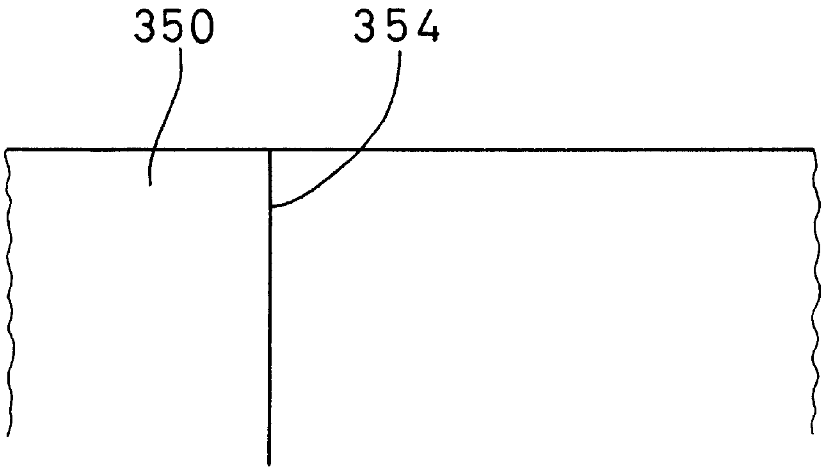

Alternatively, the sheet metal repair tool can be a sheet metal repair tool 334 as shown in FIGS. 31(*a*) and 31(*b*). In this repair tool 334, a punch 336 is brought close to a die 338 by the reciprocating drive 302 and a sheet metal is automatically bent as in the case of the sheet metal repair tool 300 shown in FIGS. 26(*a*) to 26(*c*). However, unlike the tool 304 shown in FIGS. 26(*a*) to 26(*c*), the punch 336 does not have right-angled first and second bending edges, but it has a tapered portion 339 on a position where the repair member is bent. The side edge of the tapered portion 339 on the tip portion of the punch 304 is radiused, which is shown as a radiused part 340 in FIG. 31(*a*). The inventors of the present invention actually made an experiment to bend the repair member 22, setting a radius of the radiused edge 340 to 25 mm. As shown in FIG. 32(*a*), a tapered part 342 was also formed on a bent portion of the repair member 22, and both edge portions of the tapered part 342 were radiused, which are shown as radiused parts 344 and 345 in this figure. Then, the repair member 22 was bent over as shown in FIG. 32(*a*) and bonded to the sheet metal 14 by an adhesive agent 346. After that, putty 348 was applied onto the bonded part, and a coating 350 is applied onto the surfaces of the repair member 22 and the sheet metal 14. The seam between the repair member and the sheet metal can not be seen at all from the side of the surface where coating 350 is applied.

On the other hand, when the repair member 22 was bent to form bent parts 352 and 354 as shown in FIG. 32(*b*), the seam 354 was observed on a portion near the bent part 352 on the side of the surface where coating 350 is applied as shown in FIG. 32(*c*). Particularly, the seam was clearly observed when it was exposed to the scorching sun. It is conventionally considered that the seam 354 was observed on the portion 356 near the tip of the sheet metal 14 when it was seen from the side of the surface where coating 350 is applied. However, the inventors of the present invention found that the seam 354 was appeared on the portion near the bent part 352 because heat is accumulated in the bent part 352. Based on such finding, the inventors of the present invention found the effectiveness of the tapered part 342 formed on the bent part of the repair member 22 and succeeded in erasing the seam 354 so as not to be seen from the side of the surface where the coating 350 is applied.

Figure 33A:
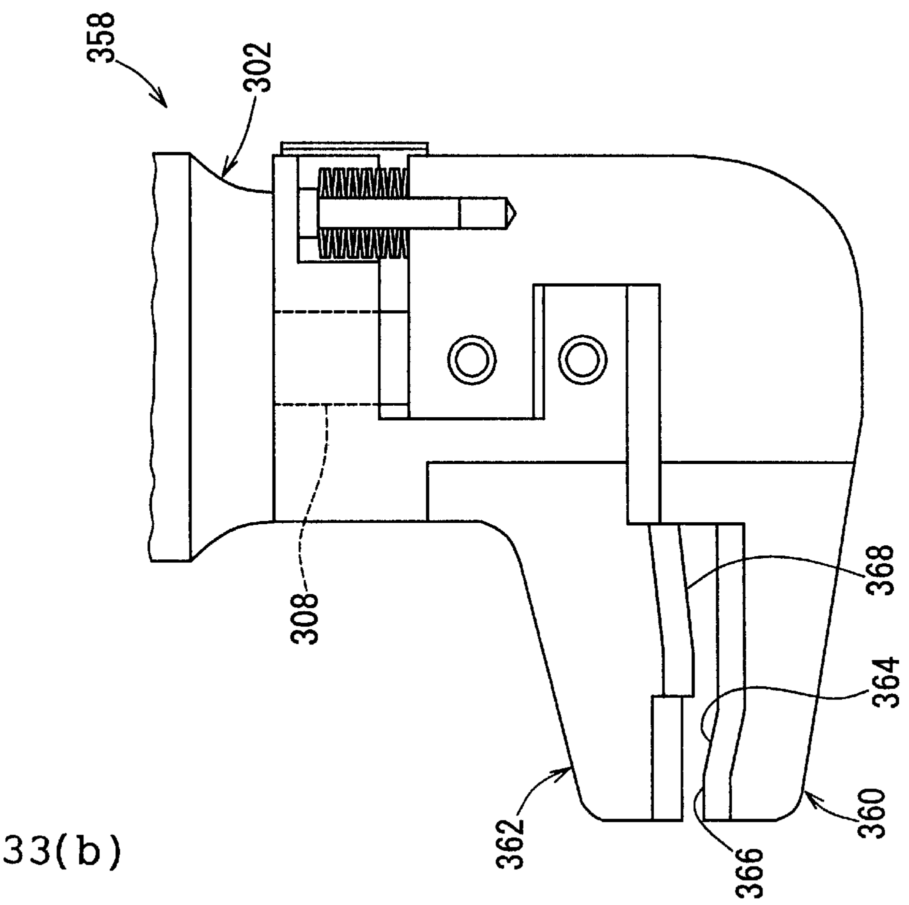
FIGS. 33(*a*) and 33(*b*) are views showing still further embodiments of the sheet metal repair tool of the present invention.
Figure 33B:
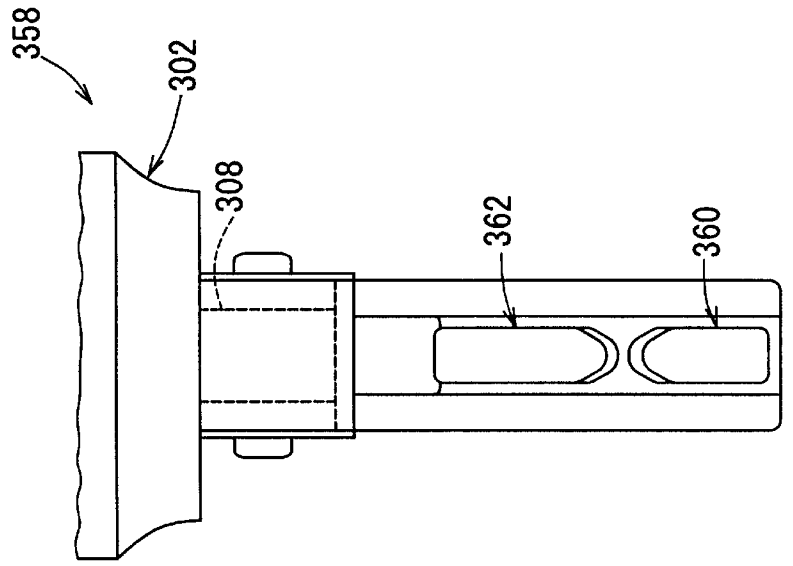

The sheet metal repair tool can be a sheet metal repair tool 358 as shown in FIGS. 33(*a*) and 33(*b*). In this tool 358, a punch 360 is brought close to a die 362 by the reciprocating drive 302, and bent parts are automatically formed on a sheet metal as in the case of the sheet metal repair tool 320 shown in FIG. The punch 360 has a tapered portion 364 on a position where the repair member 22 is bent. The side edge of the tapered portion 364 on the tip portion of the punch 360 is radiused, which is shown as a radiused part 366. The die 362 has a recess 368 for preventing the contact with the repair member 22 and for bending the repair member 22 reliably by inserting the repair member until it goes to the end. It is clear from an experiment made in the present invention that the recess 368 is more preferably formed in the die 362 on the upper side than in the punch 360 on the bottom side when a bending process is actually conducted.

Figure 34:
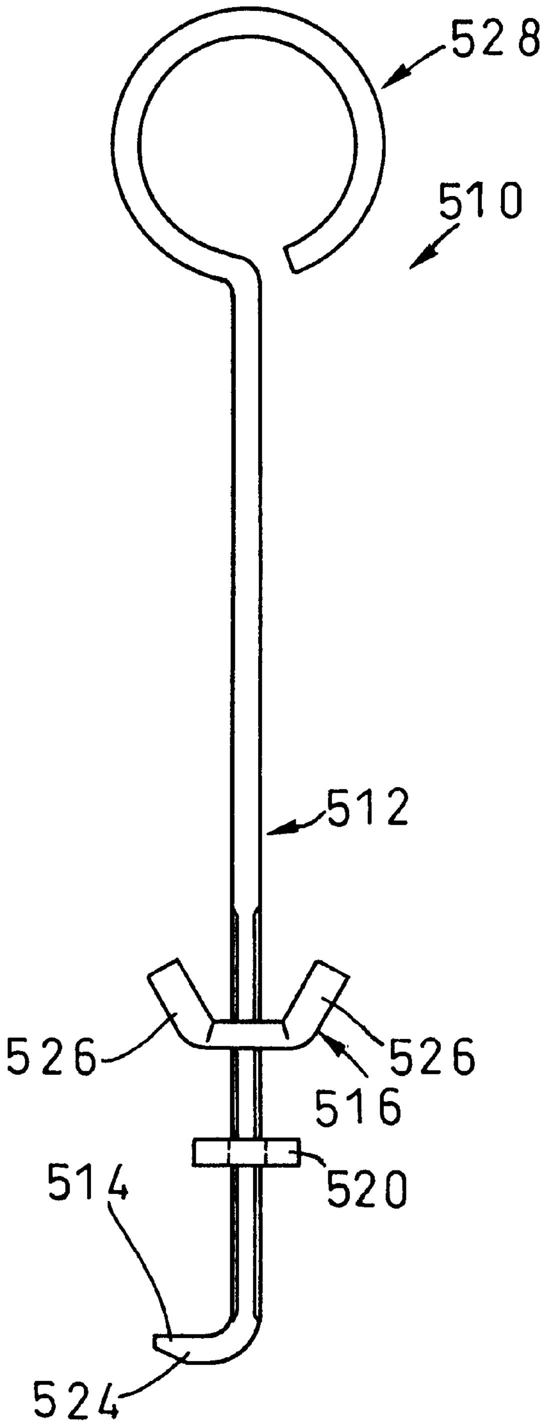
FIG. 34 is a front view showing a sheet-like member fixing device of the present invention.
Figure 35:
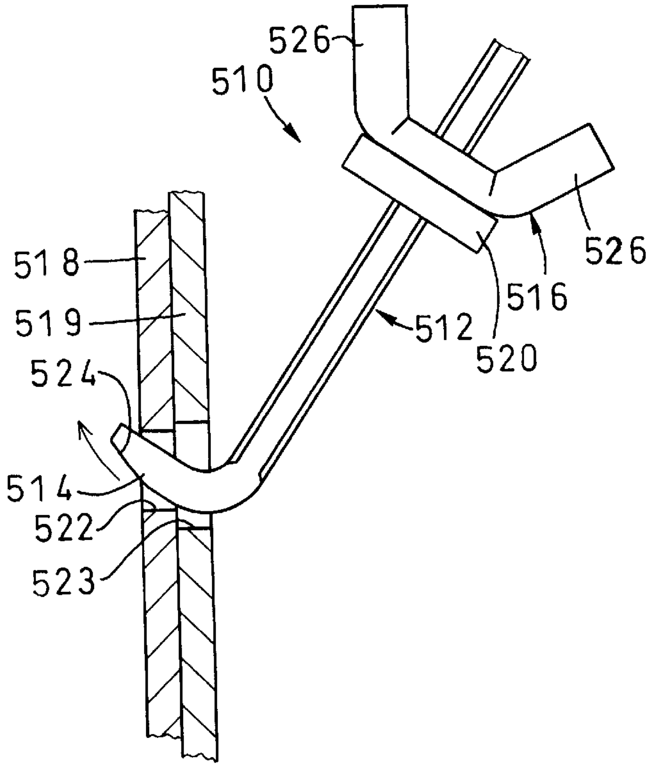
FIG. 35 is an enlarged front sectional view showing a major part of the sheet-like member fixing device shown in FIG. 1, which is being used.
Figure 36:
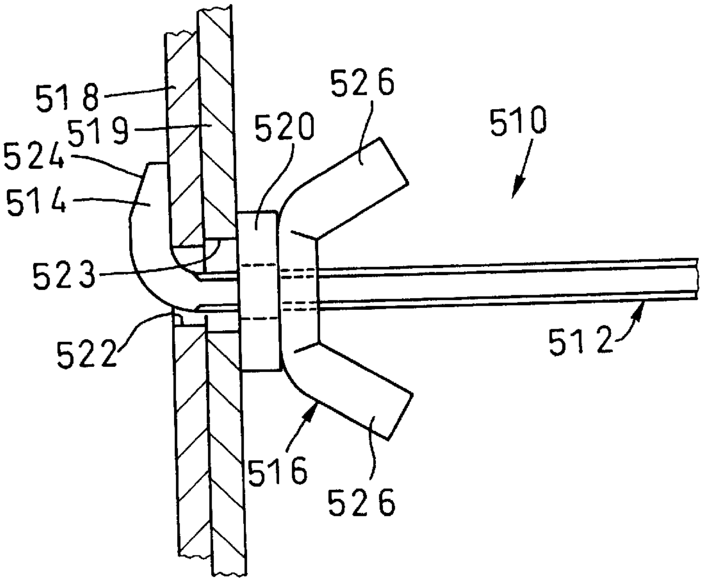
FIG. 36 is a an enlarged front sectional view showing a major part of the sheet-like member fixing device shown in FIG. 1, which is being used.
Figure 37:
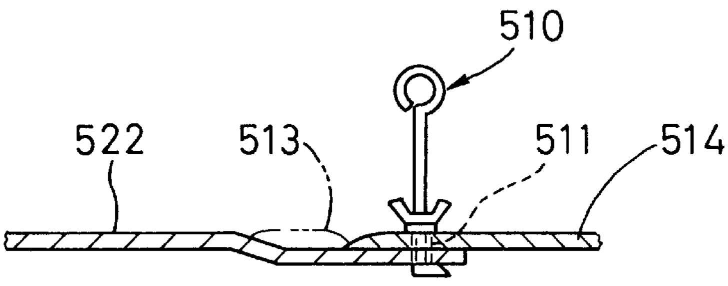
FIG. 37 a front sectional view showing a major part of the sheet-like member fixing device shown in FIG. 1, which is being used.

In FIGS. 34 to 36, the numeral 510 indicates a sheet-like member fixing device of the present invention. In this sheet-like member fixing device 510, a hook 514 is provided to an end of the rod-like male thread 512, and the male thread 512 is screwed into a female thread 516. Specifically, the male thread 512 passes through holes 520 of sheet metals (sheet-like member) 518 and 519, and the female thread 516 is tightened to support the sheet metals 518 and 519 by sandwiching them between the hook 514 and the female thread 516. A washer 520 is put between the hook 514 and the female thread 516.

The hook 514 is square to the male thread, and is allowed to pass through holes 522 and 523 from its tip so that the male thread 512 can pass through the holes 522 and 523. While the male thread 514 touches the surface of the sheet metal 518, the male thread 512 is secured to the sheet metals 518 and 519 in such a manner that the male thread 512 is square to the sheet metals 518 and 519. The edge 524 on the tip of the hook 514 is beveled and tapered.

The female thread 516 has wings 526 that make it easier to apply force by hand. The female thread 516 is tightened by hand so as to support the sheet metals 518 and 519 by sandwiching them between the hook 514 and the female thread 516.

The male thread 512 has a ring-like handle 528 on its other end. The sheet-like member fixing device can be fixed to or pulled out of the sheet metals by putting a finger into the handle 528.

The sheet-like member fixing device 510 is formed by: performing thread cutting on one end of a straight rod-like member; screwing it into the female thread; attaching a washer 520 thereto; and then bending the one end of the member at the right angle to form the hook 514 while the other end of the member is bent into a ring-like shape to form the handle 528.

When the sheet-like member fixing device 510 supports the sheet metals 518 and 519, the device is tilted against the sheet metals 518 and 519 and the hook 514 is threaded through the holes 522 and 523, as shown in FIG. 35. After threading the hook 514 through the holes 522 and 523, the sheet-like member fixing device 510 is held in the position perpendicular to the sheet metals 518 and 519, and then the female thread 516 is tightened. After that, the sheet metals 518 and 519 are supported by being sandwiched between the hook 514 and the female thread 516 and the washer 520, so that the female thread 512 is fixed in a direction substantially perpendicular to the sheet metals 518 and 519.

Thus, the sheet metals 518 and 519 are repaired and improved. In other words, the sheet metals 518 and 519 are thus positioned and temporarily fixed. The sheet metals 518 and 519 are then pulled out by holding the handle 528 with hand.

The sheet-like member fixing device 510 can be fixed with the sheet metals 518 and 519 sandwiched between the hook and the female thread, by locking the hook 514 in the sheet metals 518 and 519 and then tightening the female thread 516. For this reason, the sheet metals 518 and 519 can be positioned and temporarily fixed with safety without touching them with hand. Since the sheet-like member fixing device 510 can be fixed to the sheet metals 518 and 519 by inserting the male thread 512 into the holes 522 and 523 from the right side of the sheet metals 518 and 519 and by tightening the female thread 516, there is no need to insert hand from the back side of the sheet metals with hand to tighten a nut and the like, which makes it easier to fix the sheet-like member fixing device 510 to the sheet metals 518 and 519. In addition, by inserting hand into the space behind the sheet metals 518 and 519, a service person can work without receiving a wound in the hand, thus greater safety can be secured.

Since the sheet-like member fixing device 510 of the present invention has the handle 528, the sheet metals 518 and 519 can be supported by holding the handle 528 with hand while the sheet metals 518 and 519 are sandwiched between the hook and the female thread. Moreover, the sheet metals 518 and 519 can be pulled out, positioned and temporarily fixed by holding the handle 528 with hand with safety without touching them with hand. Thus a service person can work without receiving a wound in the hand, and therefore greater safety can be secured.

Next, a sheet metal repair method for removing a particular portion 18 including a damaged part 16 of a sheet metal 14 shown in FIG. 1 using the sheet-like member fixing device 510 will be described below. First, a repair member 22 is bent to form a first bent part 24 and a second bent part 26 using the sheet metal repair tool 12 shown in FIG. 2, and then the upper surface of the end portion of the repair member 22 is sanded down to be tapered, which makes it easier to apply pate thereto. Then, a hole 511 for the sheet-like member repair device 510 is formed in the sheet metal, and the sheet-like member fixing device 510 is inserted into the hole 511 to position and temporarily fix the repair member 22. After rivet holes are formed in the repair member 22 and the sheet metal 14, the sheet-like member fixing device 510 are removed, and burrs are shaved off. Then, adhesive agent is applied to the contact surfaces of the repair member 22 and the sheet metal 14. The repair member 22 is put in a particular position of the sheet metal 14, and then bonded thereto. The sheet-like member fixing device 510 is inserted into the hole 511 and is temporarily fixed. Then, the repair member 22 and the sheet metal 14 are fixed together by fixing rivets into the rivet holes, and dried. After that, a pate is applied to a portion 513, and a coating is applied to the surfaces of the repair member 22 and the sheet metal 14.

One embodiment of the sheet-like member fixing device of the present invention has thus been described, however, the sheet-like member fixing device of the present invention can also be materialized in other embodiments.

Figure 38:
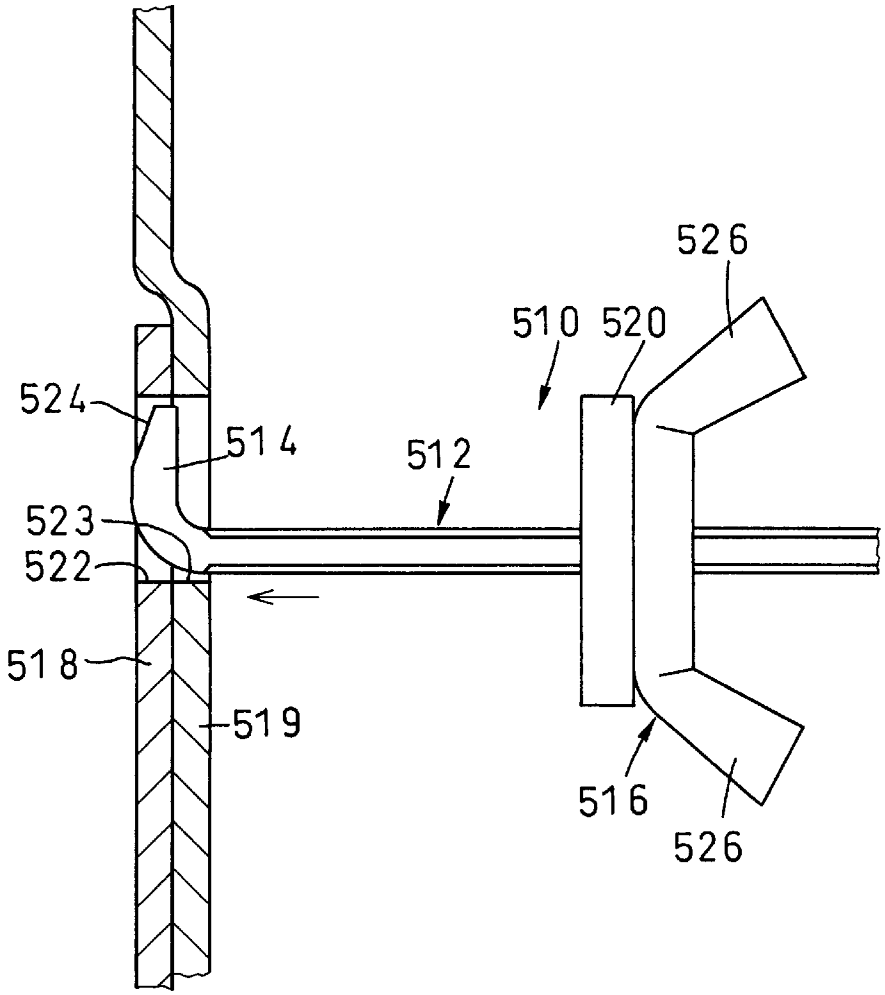
FIG. 38 is an enlarged front sectional view showing a major part of another embodiment of the sheet-like member fixing device of the present invention, which is being used.
Figure 39:
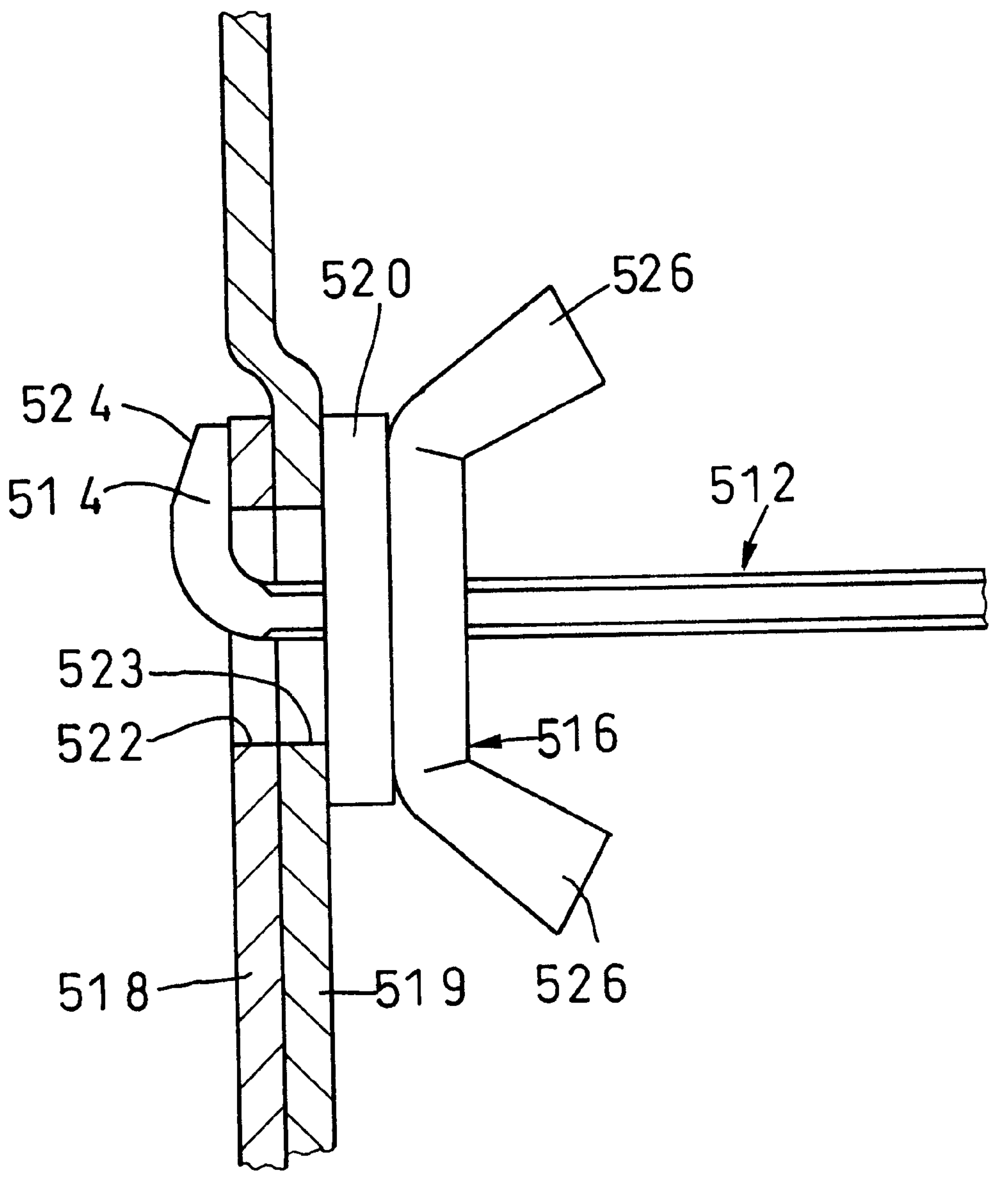
FIG. 39 is an enlarged front sectional view showing the major part of the sheet-like member fixing device shown in FIG. 5, which is being used.

For example, the sizes of the holes 522 and 523 of the sheet metals 518 and 519 are not particularly limited, but they can be bigger than the hook 514 as shown in FIGS. 38 and 39. In this case, as shown in FIG. 38, the hook 514 and the male thread 512 can be passed through the holes 522 and 523 by tilting the male thread 512 to the direction substantially perpendicular to the surfaces of the sheet metals 518 and 519. The female thread 516 is tightened by moving it to the direction substantially parallel to the surface of the sheet metals 518 and 519 while the male thread is inserted into the holes 522 and 523. By tightening the female thread, the male thread can be fixed while the sheet metals 518 and 519 are sandwiched between the hook 514 and the female thread 516 as shown in FIG. 39. Thus the hook 514 can be easily passed through the sheet metals 518 and 519 and fixed thereto.

Figure 40A:
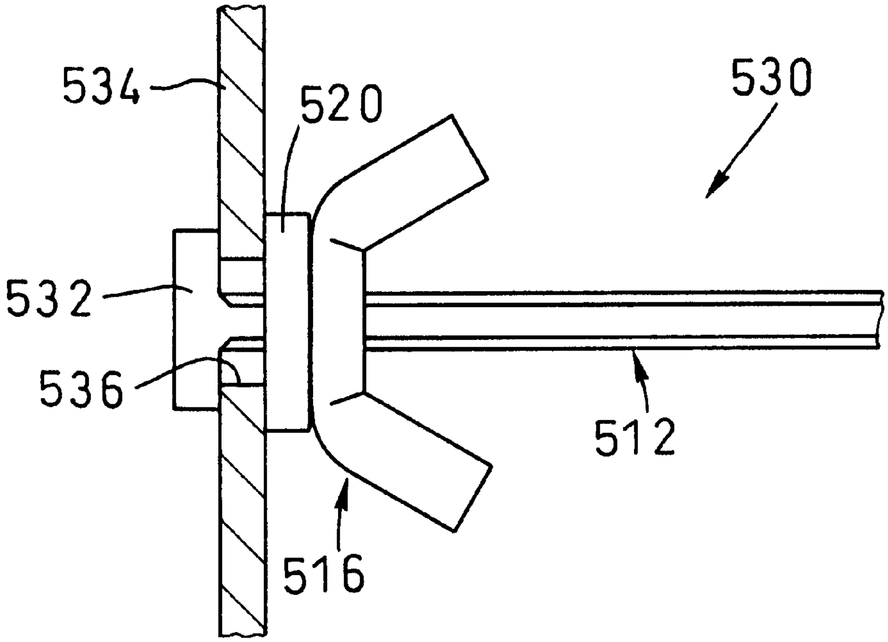
FIG. 40 are views for showing further embodiments of the sheet-like member fixing device of the present invention, which is being used.
Figure 40B:
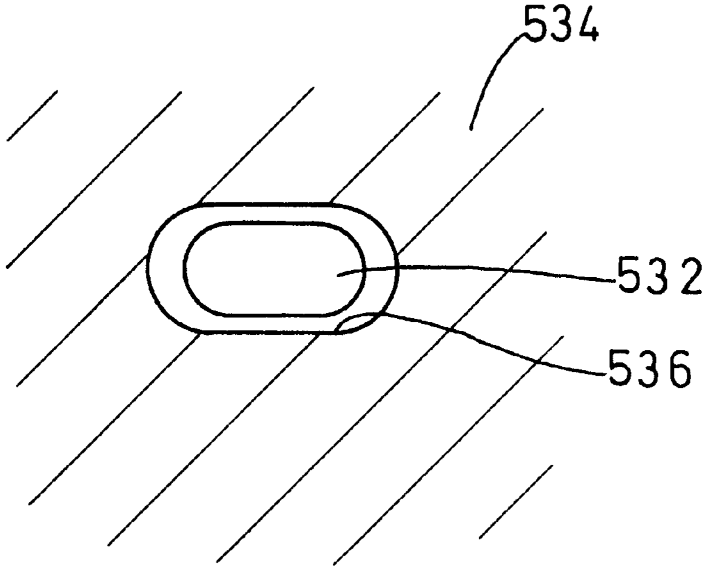

The sheet-like member fixing device can be a sheet-like member fixing device 530 shown in FIGS. 40(*a*) and 40(*b*).

This device 530 has an oval-shaped hook 532. The hook 532 is passed through an oval-shaped hole 536 of a sheet metal (sheet-like member) 534 as shown in FIG. 40(*a*) and is turned about 90 degrees. Then the female thread 516 is tightened, and thus the fixing device 530 can be fixed to the sheet metal 534 as shown in FIG. 40(*b*).

Figure 41:
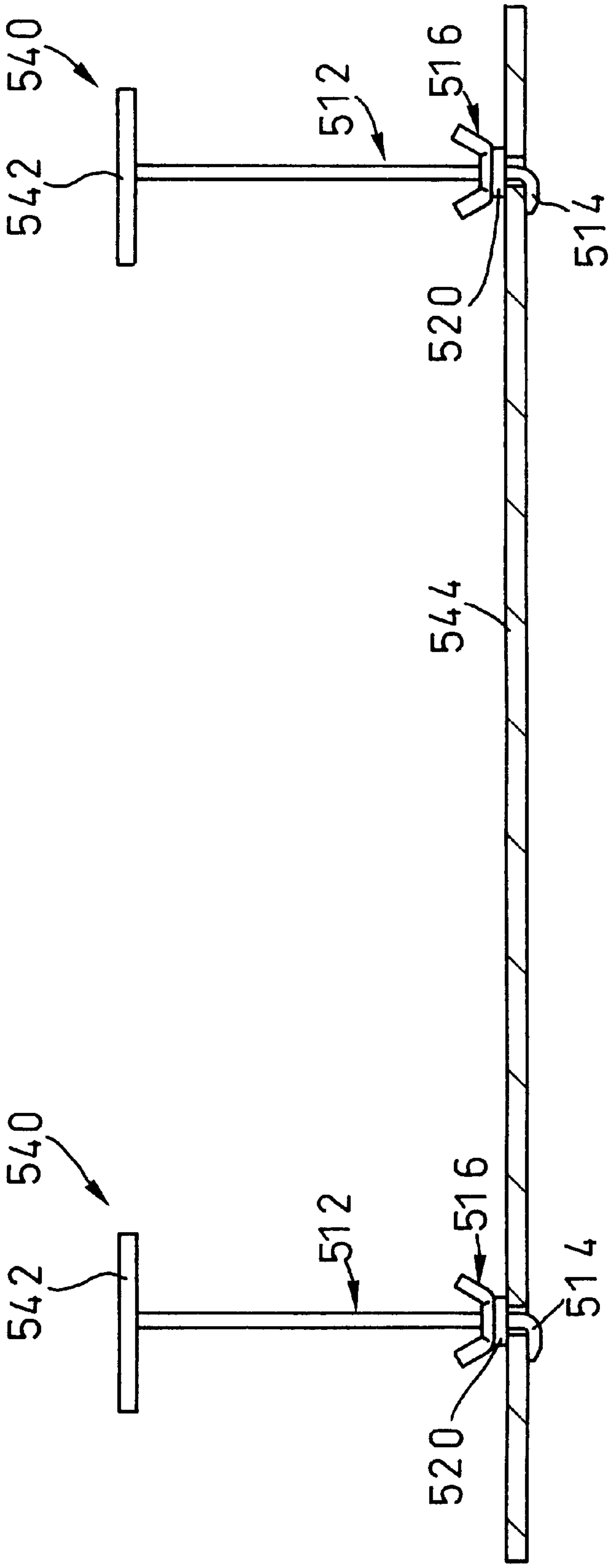
FIG. 41 is a front sectional view showing still another embodiment of the sheet-like member fixing device of the present invention, which is being used.

The sheet-like member fixing device can be a sheet-like member fixing device 540 as shown in FIG. 41. This fixing device 540 has a rod-like handle 542 which is fixed in the direction perpendicular to the male thread 512. A plurality of such fixing devices can be fixed to a sheet metal (sheet-like member) 544 to carry the sheet metal 544 by holding the handles with hand. Since such fixing device 540 makes it possible to carry the sheet metal 544 without directly holding the sheet metal with hand, a service person can work without receiving a cut on a finger, and thus greater safety can be secured.

Figure 42:
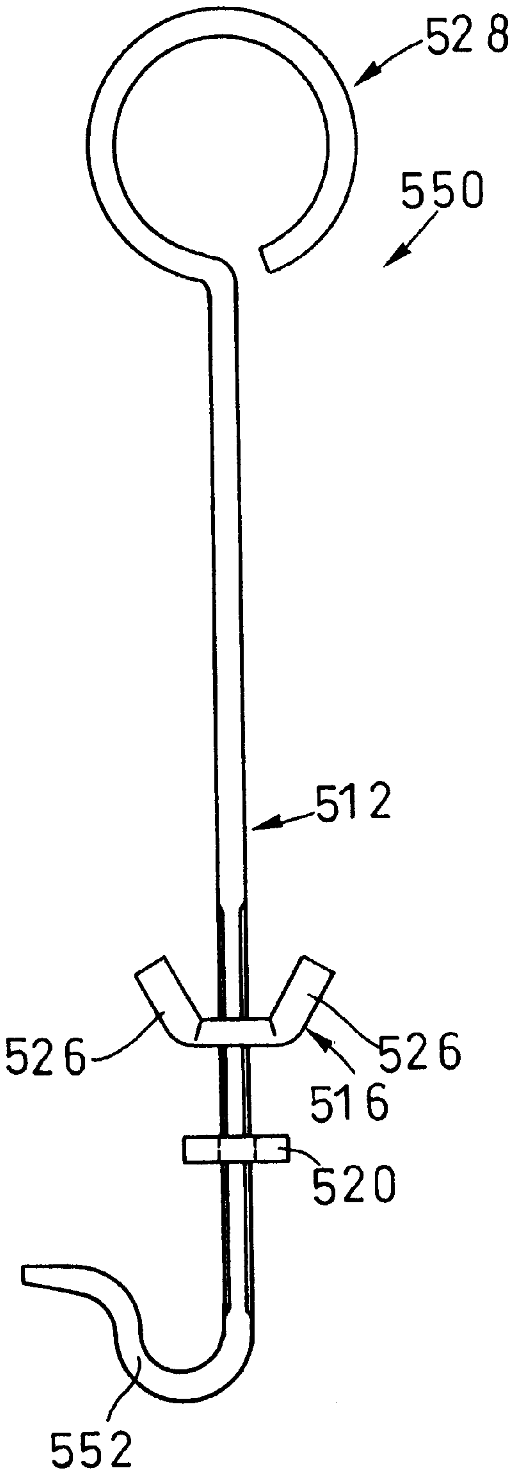
FIG. 42 is a front view showing a further embodiment of the sheet-like member fixing device of the present invention.
Figure 43A:
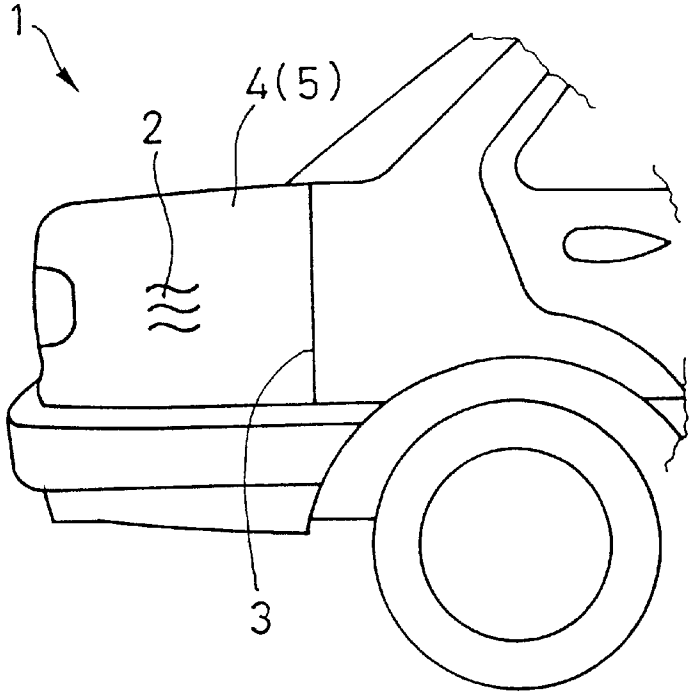
FIG. 43 are views to help explain a conventional sheet metal repair method.
Figure 43B:
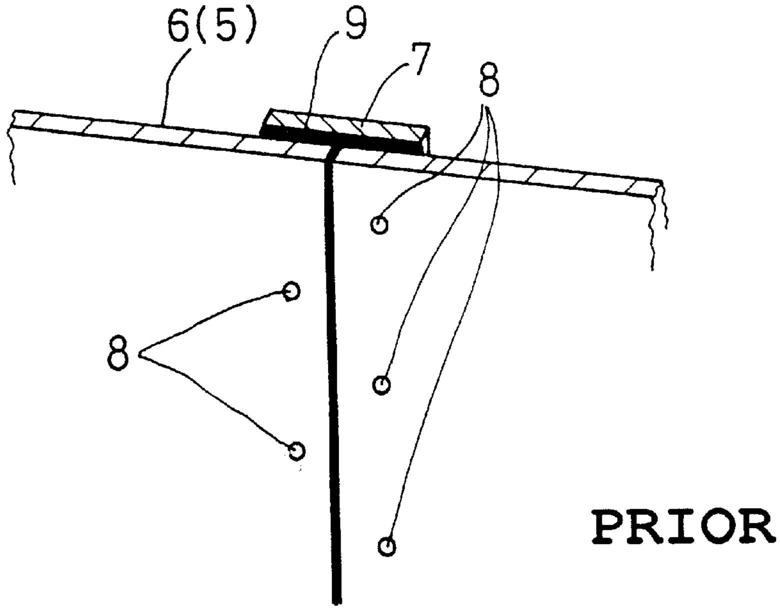
Figure 44:
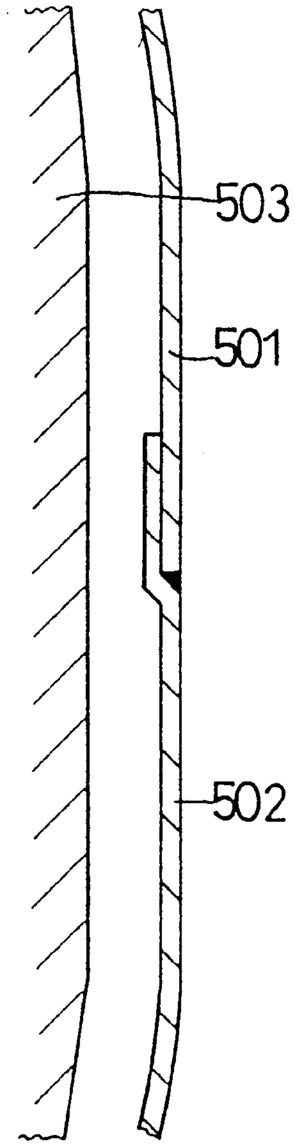
FIG. 44 is a front sectional view to help explain the direction of repairing a conventional sheet-like member.

The sheet-like member fixing device can be a sheet-like member fixing device 550 as shown in FIG. 42. This fixing device 550 has an elastic hook 552 functioning as a spring, and makes it possible to press the sheet metal elastically by the hook 552 while the sheet metal is sandwiched between the female thread 516 and the hook 552.

While the embodiments of the present invention have thus been described with reference to the accompanying drawings, it should be understood that the sheet metal repair method, the sheet metal repair tool, and the sheet-like member fixing device of the present invention be not limited to the embodiments shown in the drawings, but the repair method, the repair tool and the fixing device of the present invention can be materialized in other embodiments.

For example, the use of the sheet metal repair method and the sheet metal repair tool of the present invention is not limited to repairing a car body, but this method and tool can be used for repairing sheet-metal parts of shipboard, buildings, and the like. In addition, what is bent by using the sheet-metal repair method or the repair tool of the present invention is not limited to a repair member, but a sheet metal of a car body and the like can be bent. The shape and the size of a bent part is not particularly limited, as far as the repair member fits the shape of the gap in the sheet metal.

The sheet-like member fixing device of the present invention can be used not only for repair on a sheet metal but also for repair on or conveyance of a sheet-like member made of wood, resin, or glass. The sheet-like member fixing device of the present invention can also be fixed to other material than a sheet-like member.

Furthermore, the hook is not limited to the one brought into close contact with the sheet metal, but it can be the one whose tip is only brought into close contact with the sheet metal. Additionally, the female thread is not limited to the above, but it can be a nut which is tightened by a fastener. The shape of the handle is not particularly limited as far as it can be held with hand or tools. The number of sheet-like members supported by being sandwiched between the female thread and the hook is not limited to one or two as described above, but three or more sheet-like members can be also used. For example, the sheet-like member fixing device can be used for carrying or storing a plurality of sheet metals.

The present invention is intended to embrace various modifications, alternations and changes made on the basis of knowledge of those skilled in the art without departing from the scope of the invention. Furthermore, any of the specific inventive aspects of the present invention may be replaced with other technical equivalents for embodiment of the present invention, as long as the effects and advantages intended by the invention can be insured.

INDUSTRIAL APPLICABILITY

The sheet-metal repair method and the sheet metal repair tool of the present invention make it possible to repair the sheet metal by bending a portion near the end part of a repair member or a portion near the end part of a sheet metal to which the repair member is fixed and then by bonding the repair member to the sheet metal in accordance with a shape of the gap without using any reinforcing member. Thus, the present invention makes it easier to repair a sheet metal of a car body and the like, and repairing steps and costs can be reduced. Furthermore, compared to the case where a reinforcing member is used, the number of bonded parts is reduced in the present invention, so that bonding strength and resistance to corrosion are improved.

In the sheet metal repair method and tool of the present invention, a repair member or a sheet metal is bent stepwise to form a first bent part and a second bent part which is bent in the direction opposite to the first bent part. While the end part of the repair member or the end part of the sheet metal is fitted to the bent parts of the sheet metal or the repair member, the portion nearer to the end than the second bent part of the repair member or the sheet metal is bonded to the sheet metal or the repair member, and thus the repair member is bonded flush with the sheet metal. For this reason, a finish can be easily given to the bonded part, and the appearance is enhanced.

According to the sheet metal repair method of the present invention characterized in that the first and the second bent parts are formed at one time with a sheet metal repair tool comprising a punch and a die which are shaped to fit with the first and the second bent parts, the first and the second bent parts are manually or automatically formed at one time. For this reason, the first and the second bent parts can be quickly and easily formed. Furthermore, the first and second bent parts of a particular shape can be reliably formed by a punch and a die.

According to the sheet metal repair method of the present invention characterized in that a part of or a whole of joint surfaces of the bonded part of the repair member and the sheet metal is bonded by an adhesive agent, an adhesive agent and rivet, or a combination of an adhesive agent, rivet, and spot welding. For this reason, the repair member can be easily and firmly bonded to the sheet metal by welding, an adhesive agent, or a combination of welding and an adhesive agent.

According to the sheet metal repair method of the present invention characterized in that the portion near the end part of the repair member and/or the portion near the end part of the sheet metal is/are bent to remove distortion on the portion near the end part before the repair member and the sheet metal are bonded together, the repair member can be easily, accurately, and firmly bonded to the sheet metal by removing distortion.

According to the sheet metal repair method of the present invention characterized in that the portion near the end part of the repair member and/or the portion near the end part of the sheet metal is/are bent so that the first bent part is curved, a seam can be prevented from appearing on the outer surface of the bonding part between the repair member and the sheet metal. Such an effect was obtained in the actual experiment made by the inventors of the present invention, and the inventors of the present invention found that a seam appearing on the surface to be painted was caused by the first bent part.

According to the sheet metal repair tool of the present invention characterized in that at least the first bent part is formed by placing the punch or die on the point of action of a lever element having the point of application of force, the fulcrum, and the point of action, and then bringing the punch and the die closer by the application of griping force or pushing force to the point of action, the portion near the end part of the repair member or the portion near the end part of the sheet metal can be easily bent by the application of griping force or pushing force to the punch and the die, using an action of the lever element. Furthermore, the tool is a hand-held and compact one, so that it can be easy to handle and carry.

According to the sheet metal repair tool of the present invention characterized in that the punch and the die each have a first bending edge and a second bending edge, desired shapes of the first bent part and the second bent part can be reliably formed at predetermined angles by using the first and second bending edges. Therefore, bending accuracy and workability can be improved.

According to the sheet metal repair tool of the present invention characterized in that the distance between the first bending edge and the second bending edge of the punch and the distance between the first bending edge and the second bending edge of the die are substantially same as the thickness of the repair member or the sheet metal, the repair member is reliably bonded flush with the sheet metal by making the difference in level between the first bent part and the second bent part substantially equal to the thickness of the repair member or the sheet metal. Therefore, a finish can be easily given after the bonding process, and the outward appearance can be enhanced after repairing process.

According to the sheet metal repair tool of the present invention characterized in that either the punch or the die or both of them has/have a tapered portion in a position where the first bent part is to be formed and the first bent part is bent curvedly by the tapered portion, a seam can be prevented from appearing on the outer surface of the bonding part between the repair member and the sheet metal.

According to the sheet-like member fixing device of the present invention, the fixing device is fixed to the sheet-like member, or the sheet-like member is fixed to the fixing device while the sheet-like member is supported by being sandwiched between the female thread and the hook, using holes formed in the sheet-like member. Therefore, a plurality of sheet-like members can be bonded by being sandwiched between the female thread and the hook, and a plurality of sheet-like members can be easily positioned and temporarily fixed.

According to the sheet-like member fixing device of the present invention characterized in that the male thread is passed through the hole from its hook's side, the male thread can be easily passed through the hole by inserting the hook into the hole of a sheet-like member. Therefore, the sheet-like member fixing device can be fixed to the sheet-like member, or the sheet-like member can be fixed to the sheet-like member fixing device by inserting the male thread into the hole form the front side of the sheet-like member and then tightening the female thread without inserting hand from the back side of the sheet metals to tighten a nut and the like. thus workability can be improved and greater safety can be secured.

According to the sheet-like member fixing device of the present invention characterized in that the hook is substantially square to the male thread, the sheet-like member can be supported by being sandwiched between the hook and the female thread while the hook is in close contact with the back surface of the sheet-like member. Therefore, the sheet-like member fixing device can be fixed firmly to the sheet-like member, or the sheet-like member can be fixed firmly to the fixing device by increasing a contact surface of the hook and the sheet-like member to produce a larger friction.

According to the sheet-like member fixing device of the present invention characterized in that the male thread is fixed in the direction substantially perpendicular to the hook which is brought in close contact with the surface of the sheet-like member, the sheet-like member fixing device can be easily supported because the male thread and the sheet-like member are fixed in the direction perpendicular to each other when the sheet-like member fixing device and the sheet-like member are fixed together. When the sheet-like member is pulled out, force can be applied in the direction substantially perpendicular to the surface of the sheet-like member by applying a pulling force in the direction to the make thread. Therefore, the sheet-like member can be pulled out, positioned, and temporarily fixed with efficiency and accuracy.

According to the sheet-like member fixing device of the present invention characterized in that the hook points to one direction, the hook can be easily inserted into the hole while the device is tilted against the sheet-like member. Furthermore, the hook can be easily locked in the sheet-like member by moving the device to the direction where the hook points, while the hook and the male thread are being inserted into the hole. Additionally, the sheet-like member fixing device can be easily inserted into the hole of the sheet-like member without getting stuck in the hole when the hook is inserted into the hole. Therefore, the sheet-like member fixing device can be fixed to the sheet-like member with efficiency. In addition, since the hook only points to one direction, the sheet-like member fixing device become compact, which leads to the easy production and cost reduction.

According to the sheet-like member fixing device of the present invention characterized in that the edge of the hook fixed in the direction substantially perpendicular to the male thread is beveled, the tip portion of the hook is tapered, so that the hook can be easily inserted into the hole even when the hole is small. Furthermore, great safety can be achieved by beveling the edge of the hook. In addition, when the sheet-like member is made of soft material, the hole is not necessarily formed in advance. In this case, the sheet-like member fixing device can be passed through the sheet-like member by hitting the hook with a tool. Thus, since there is no need to conduct the step of forming a hole, workability can be improved.

According to the sheet-like member fixing device of the present invention characterized in that a handle is provided to the other end of the male thread, the sheet-like member can be easily supported by holding the handle with hand or tool, and therefore the sheet-like member can be easily pulled out, positioned, and temporarily fixed by holding the handle.

According to the sheet-like member fixing device of the present invention characterized in that the handle is shaped like a ring, great force can be easily applied to the fixing device fixed to the sheet-like member by putting a finger into the ring-like handle. Thus, the sheet-like member can be easily pulled out, positioned, and temporarily fixed by applying great force to the fixing device. According to the sheet-like member fixing device of the present invention characterized in that the female thread can be screwed down by hand, the female thread of such sheet-like member fixing device has wings that makes it easier to apply force, so that the female thread can be easily screwed down by hand. Furthermore, the female thread can be easily and firmly tightened from the surface side of the sheet-like member by holding the handle with one hand and by screwing down the female thread with the other hand.

What is claimed is:

1. In a method for repairing sheet metal having a damaged part, said method comprising the steps of:

(a) removing a portion of the sheet metal which includes the damaged part, thereby leaving a gap in said sheet metal where said portion was removed, said sheet metal, with said gap therein, having an outer surface and a first edge portion at a boundary of said gap;

(b) forming a repair member for insertion in said gap, said repair member having an outer surface and a second edge portion which extends over the first edge portion of said sheet metal when said repair member is placed over said gap;

(c) bending one of said first edge portion and said second edge portion in a first direction to form a bent part and bending said bent part in a second direction, parallel to but offset from the adjacent unbent outer surface of the sheet metal or repair member, respectively; and (d) bonding the second edge portion of the repair member to the first edge portion of said sheet metal with the outer surface of the repair member substantially flush with the outer surface of the sheet metal;

the improvement wherein the bent part is bent in the first direction and the second direction with a sheet metal repair tool, said sheet metal repair tool comprising, in combination:

(1) a punch, having a first bending edge and a second bending edge, for bending said bent part in said first direction and said second direction, respectively, at the same time;

(2) a die, arranged to mate with said punch and having a first bending edge and a second edge, for bending said bent part in said first direction and said second direction, respectively, at the same time;

(3) pliers for holding and pressing said punch and said die together, said pliers comprising:

(i) a stationary handle having first and second ends with said die attached to said first end thereof;

(ii) a lever element having first and second ends, said punch being attached to said first end thereof, said lever element and said stationary handle being pivoted with respect to each other about a first pivot point adjacent their respective first ends, such that said punch and said die are pressed together in mating relationship, or moved apart, as said stationary handle and said lever element are moved about said first pivot point;

(iii) a pivotable handle, having a first end and a second end, said first end of said pivotable handle being pivoted with respect to said stationary handle about a second pivot point substantially midway between said first end and said second end of said stationary handle and adjacent said second end of said lever element;

(iv) means for coupling said first end of said pivotable handle and said second end of said lever element, thereby to move said lever element about said first pivot point when said second ends of said stationary handle and said pivotable handle are moved with respect to each other;

whereby said punch and said die may be pressed together with great mechanical advantage when said second ends of said stationary handle and said pivotable handle are moved toward each other, and whereby the removed portion of said sheet metal is replaced with said repair member.

2. The sheet metal repair method according to claim 1, wherein at least a part of the first and second portions are bonded by an agent selected from the group consisting of an adhesive a rivet, spot welding and a combination of at least two of an adhesive, rivet and spot welding.

3. The sheet metal repair method according to claim 1, wherein an area near the second edge portion of the repair member and the first edge portion of the sheet metal is bent to remove distortion before the repair member and the sheet metal are bonded together.

4. The sheet metal repair method according to claim 1, wherein said one of the second edge portion of the repair member and the first edge portion of the sheet metal is bent such that the bent part is curved.

5. The sheet metal repair method according to claim 1, wherein the bent part is bent in the first direction and the second direction at the same time with a sheet metal repair tool comprising a punch and a die.

6. The sheet metal repair method according to claim 5, wherein the punch or die is placed on a point of action of a lever element which applies a force between a fulcrum and the point of action, and wherein the bent part is formed by bringing the punch and the die closer by the application of a gripping force or pushing force to the lever element.

7. The sheet metal repair method according to claim 5, wherein the punch and the die each have a first bending edge and a second bending edge, and wherein the first bending edges of the punch and the die bend the bent part in the first direction and the second bending edges thereof bend the bent part in the second direction.

8. The sheet metal repair method according to claim 7, wherein the distance between the first bending edge and the second bending edge of the punch and the distance between the first bending edge and the second bending edge of the die are substantially same as the thickness of the bent part.

9. The sheet metal repair method according to claim 5, wherein at least one of the punch and the die has a tapered portion in a position where the bent part is to be bent in the first direction so that the bent part is bent curvedly by the tapered portion.

10. In a method for repairing sheet metal having a damaged part, said method comprising the steps of:

(a) removing a portion of the sheet metal which includes the damaged part, thereby leaving a gap in said sheet metal where said portion was removed, said sheet metal, with said gap therein, having an outer surface and a first edge portion at a boundary of said gap;

(b) forming a repair member for insertion in said gap, said repair member having an outer surface and a second edge portion which extends over the first edge portion of said sheet metal when said repair member is placed over said gap;

(c) bending one of said first edge portion and said second edge portion in a first direction to form a bent part and bending said bent part in a second direction, parallel to but offset from the adjacent unbent outer surface of the sheet metal or repair member, respectively; and (d) bonding the second edge portion of the repair member to the first edge portion of said sheet metal with the outer surface of the repair member substantially flush with the outer surface of the sheet metal;

the improvement wherein the bent part is bent in the first direction and the second direction with a sheet metal repair tool, said sheet metal repair tool comprising, in combination:

(1) a punch, having a first bending edge and a second bending edge, for bending said bent part in said first direction and said second direction, respectively, at the same time;

(2) a die, arranged to mate with said punch and having a first bending edge and a second edge, for bending said bent part in said first direction and said second direction, respectively, at the same time;

(3) pliers for holding and pressing said punch and said die together, said pliers comprising:

(i) a stationary handle having first and second ends with said die attached to said first end thereof;

wherein the punch and a die each have a first bending edge and a second bending edge, respectively, the first bending edges of the punch and the die bending the bent part in the first direction and the second bending edges thereof bend the bent part in the second direction when the punch and die are pressed together; and wherein the distance between the first bending edge and the second bending edge of the punch and the distance between the first bending edge and the second bending edge of the die are substantially same as the thickness of the bent part;

whereby the removed portion of said sheet metal is replaced with said repair member.

* * * * *